US006789011B2

(12) United States Patent
Baiada et al.

(10) Patent No.: US 6,789,011 B2
(45) Date of Patent: Sep. 7, 2004

(54) METHOD AND SYSTEM FOR ALLOCATING AIRCRAFT ARRIVAL/DEPARTURE SLOT TIMES

(76) Inventors: R. Michael Baiada, 30943 Buttermilk Ct., Evergreen, CO (US) 80439; Lonnie Bowlin, 700 Woodland Way, Owings, MD (US) 20736

( * ) Notice: Subject to any disclaimer, the term of this patent is extended or adjusted under 35 U.S.C. 154(b) by 15 days.

(21) Appl. No.: 10/299,640

(22) Filed: Nov. 19, 2002

(65) Prior Publication Data

US 2003/0139875 A1 Jul. 24, 2003

Related U.S. Application Data

(60) Provisional application No. 60/332,614, filed on Nov. 19, 2001, provisional application No. 60/424,355, filed on Nov. 6, 2002, provisional application No. 60/317,803, filed on Sep. 7, 2001, provisional application No. 60/274,109, filed on Mar. 8, 2001, provisional application No. 60/189,223, filed on Mar. 14, 2000, provisional application No. 60/173,049, filed on Dec. 24, 1999, and provisional application No. 60/129,563, filed on Apr. 16, 1999.

(51) Int. Cl.[7] ........................ G06F 19/00; G06F 163/00
(52) U.S. Cl. ........................ 701/120; 701/121; 701/122; 701/301; 342/34; 342/36
(58) Field of Search ................................ 701/120, 121, 701/117, 301, 122, 213, 204; 340/435, 903, 961; 342/454, 37, 38, 36, 34

(56) References Cited

U.S. PATENT DOCUMENTS

| | | | | |
|---|---|---|---|---|
| 4,196,474 A | | 4/1980 | Buchanan | 364/461 |
| 5,200,901 A | | 4/1993 | Gerstenfeld | 364/439 |
| 5,265,023 A | * | 11/1993 | Sokkappa | 701/120 |
| 5,321,605 A | | 6/1994 | Chapman | 364/402 |
| 5,369,570 A | | 11/1994 | Parad | 364/401 |
| 5,890,133 A | | 3/1999 | Ernst | 705/7 |
| 5,953,707 A | | 9/1999 | Huang et al. | 705/10 |
| 6,463,383 B1 | * | 10/2002 | Baiada et al. | 701/120 |
| 2002/0177943 A1 | * | 11/2002 | Beardsworth | 701/120 |
| 2004/0054550 A1 | * | 3/2004 | Cole et al. | 705/1 |

FOREIGN PATENT DOCUMENTS

| | | |
|---|---|---|
| AU | WO0062234 | 10/2000 |
| GB | 2327517 | 6/1997 |

* cited by examiner

*Primary Examiner*—Thomas G. Black
*Assistant Examiner*—Ronnie Mancho
(74) *Attorney, Agent, or Firm*—Larry J. Guffey

(57) ABSTRACT

A computer program product, that allows an aviation system to temporally allocate aircraft slot times during a specified period for the flow of a plurality of aircraft toward a specified fix point, has, according to the present invention: (1) a means for collecting and storing specified data and criteria, (2) a means for processing, at a specified instant for which it is desired to allocate the slot times, the specified data applicable at that instant to each of the aircraft and associated resources so as to predict an arrival fix time for each of the aircraft at the specified fix point, (3) a means for accepting and storing a request by the operator of each of the aircraft for one of the slot times, (4) a means for accepting and storing a request by an operator of the present invention to create slack time in the specified period, (5) a means, utilizing the slot and slack time requests and the predicted arrival fix times for any of the plurality of aircraft for which a slot time request was not made, for predicting the demand for the slot times, (6) a means, based upon specified data that is applicable to the specified period and fix point, for predicting the availability of the slot times within the specified period, and (7) a means, based upon the operator requests, predicted demand for and availability of the slot times and slot time allocation criteria, for allocating the slot times.

18 Claims, 21 Drawing Sheets

(1 of 21 Drawing Sheet(s) Filed in Color)

Sample Data Flow Diagram

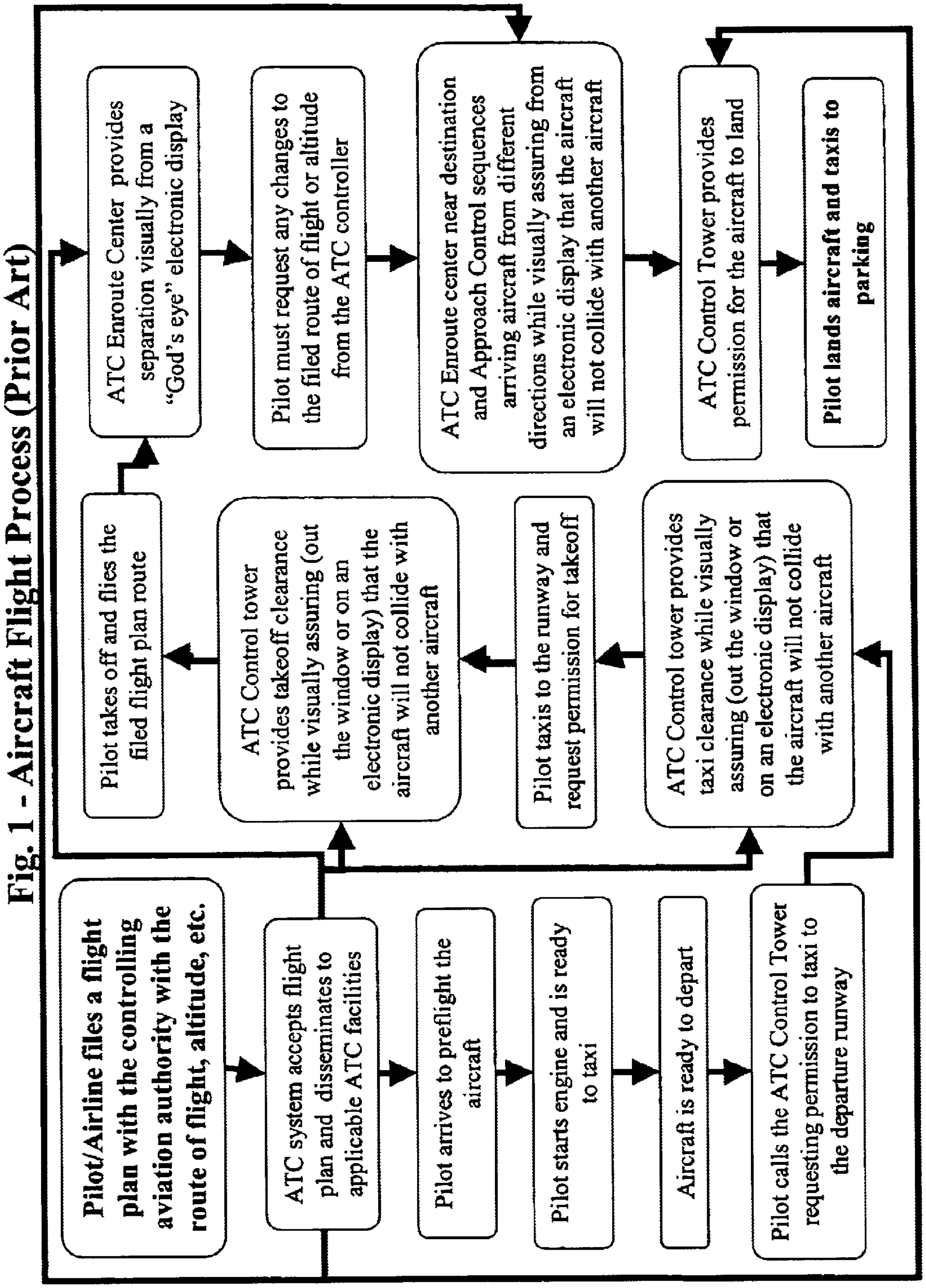
Fig. 1 - Aircraft Flight Process (Prior Art)

Fig. 2- Airport Arrival/Departure Flow (Prior Art)
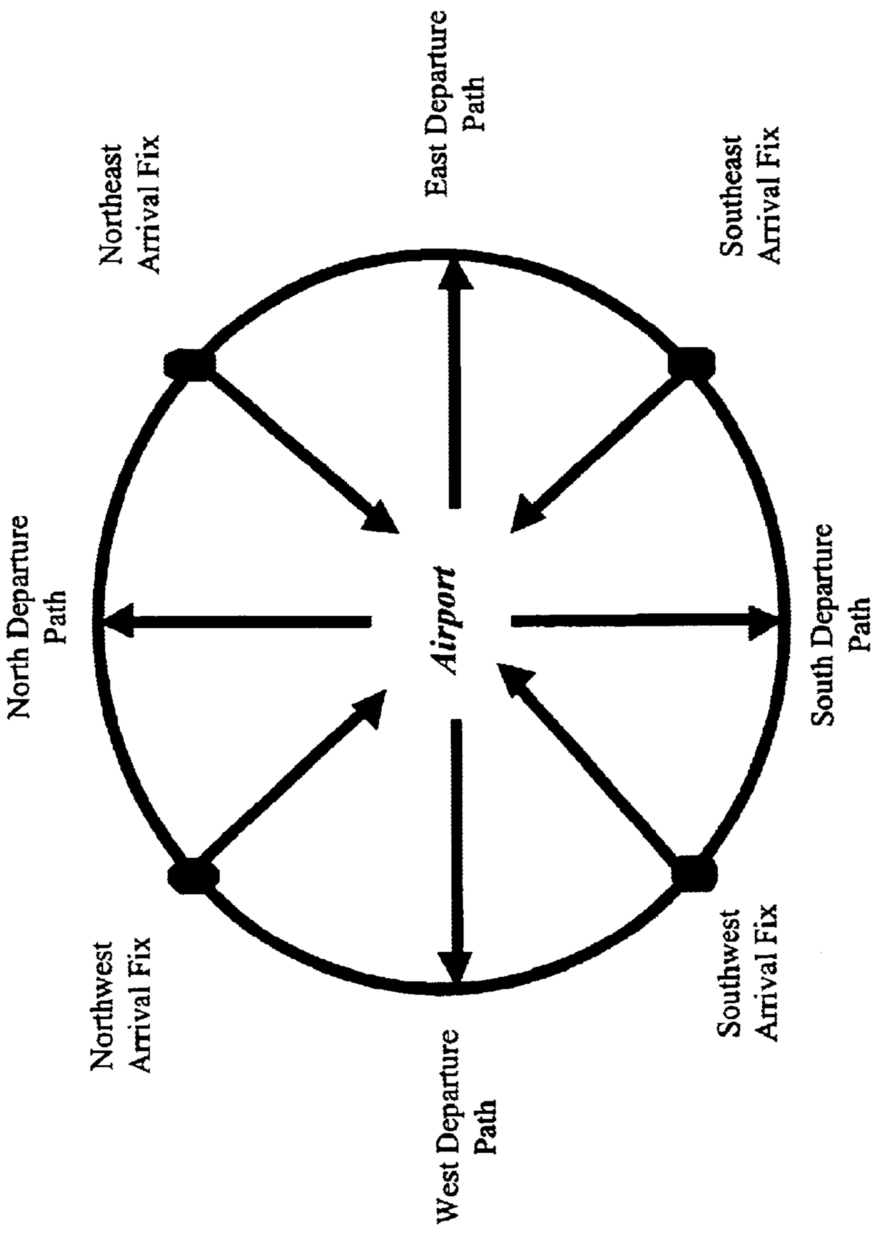

**Fig. 3 - DFW CTAS Data,
2200 TO 2230 CMT Arrivals - 11/6/98 (Prior Art)**

| | | | |
|---|---|---|---|
| 1. AAL458 | SJC | 18R | 2201 |
| 2. EGF026 | MEM | 17L | 2201 |
| 3. AAL1707 | TPA | 17C | 2201 |
| 4. EGF202 | SHV | 17L | 2202 |
| 5. EGF784 | ACT | 13R | 2202 |
| 6. TWA453 | STL | 18R | 2202 |
| 7. EGF736 | TUL | 17L | 2203 |
| 8. AAL1498 | SNA | 18R | 2203 |
| 9. AAL2038 | IAH | 17C | 2203 |
| 10.AAL79 | EGK | 17C | 2204 |
| 11.EGF650 | LIT | 17L | 2204 |
| 12.AWE544 | PHX | 18R | 2205 |
| 13.EGF854 | TYR | 17L | 2206 |
| 14.KHA200 | FTW | 13R | 2206 |
| 15.DAL237 | ATL | 18R | 2207 |
| 16.EGF094 | GGG | 17L | 2207 |
| 17.AAL1779 | LIT | 17C | 2207 |
| 18.EGF128 | TXK | 17C | 2208 |
| 19.EGF718 | MAF | 13R | 2208 |
| 20.AAL656 | ABQ | 18R | 2209 |
| 21.EGF114 | LCH | 17L | 2209 |
| 22.AAL2161 | EWR | 17C | 2209 |
| 23.EGF621 | HOU | 17L | 2210 |
| 24.EGF704 | XNA | 17C | 2210 |
| 25.AAL1188 | ONT | 13R | 2210 |
| 26.AAL50 | DEN | 18R | 2211 |
| 27.AAL1714 | LAS | 13R | 2212 |
| 28.AAL839 | MSY | 17C | 2213 |
| 29.AAL1412 | ELP | 18R | 2214 |
| 30.AAL1720 | OKC | 13R | 2214 |
| 31.AAL1306 | SLC | 13R | 2215 |
| 32.AAL2233 | ORD | 17C | 2216 |
| 33.COA186 | IAH | 18R | 2217 |
| 34.AAL1404 | COS | 17C | 2217 |
| 35.AAL742 | MCI | 13R | 2218 |
| 36.USA777 | PIT | 18R | 2218 |
| 37.AAL1016 | SAN | 17C | 2219 |
| 38.AAL1280 | LGB | 18R | 2219 |
| 39.AAL1884 | SAT | 17C | 2220 |
| 40.AAL794 | SEA | 13R | 2221 |
| 41.AMT255 | MDW | 18R | 2221 |
| 42.AAL48 | PHX | 13R | 2222 |
| 43.AAL564 | ICT | 17C | 2222 |
| 44.AAL496 | TUS | 18R | 2223 |
| 45.AAL9649 | MCO | 17C | 2223 |
| 46.AAL1552 | SFO | 18R | 2226 |
| 47.AAL1890 | LAX | 17C | 2226 |
| 48.UAL478 | SFO | 18R | 2228 |
| 49.UAL1055 | ORD | 18R | 2229 |
| 50.AAL1978 | AUS | 17C | 2230 |

Fig. 4 - December 2000 DOT Data (Prior Art)

DECEMBER 2000 AIR TRAVEL CONSUMER REPORT
TABLE 3. PERCENTAGE OF ALL CARRIERS' REPORTED FLIGHT OPERATIONS ARRIVING ON TIME BY AIRPORT AND TIME OF DAY (REPORTABLE AIRPORTS ONLY)

| ARRIVAL AIRPORT<br>SCHEDULED<br>ARRIVAL TIME | ATL | BOS | BWI | CLT | CVG | DCA | DEN | DFW | DTW | EWR | IAH | JFK | LAS |
|---|---|---|---|---|---|---|---|---|---|---|---|---|---|
| 600 - 659 AM | 80.4 | 72.7 | 71.0 | 91.3 | 66.7 | 50.0 | 72.4 | 75.1 | 63.7 | 71.0 | 90.4 | 72.8 | 90.7 |
| 700 - 759 AM | 71.5 | 71.1 | 84.0 | 81.5 | 68.6 | 70.8 | 71.9 | 80.5 | 68.6 | 72.0 | 84.6 | 65.6 | 92.3 |
| 800 - 859 AM | 62.7 | 68.3 | 84.6 | 71.7 | 75.7 | 81.5 | 74.5 | 68.3 | 64.1 | 73.3 | 80.2 | 80.6 | 76.7 |
| 1000 - 1059 AM | 60.4 | 67.9 | 75.5 | 66.1 | 73.8 | 68.6 | 65.1 | 72.1 | 67.0 | 74.0 | 77.4 | 78.0 | 61.3 |
| 1100 - 1159 AM | 61.3 | 70.0 | 78.7 | 75.1 | 59.7 | 71.8 | 72.7 | 70.5 | 63.7 | 72.7 | 70.6 | J/ | 68.1 |
| 1200 - 1259 PM | 60.3 | 68.9 | 79.2 | 65.2 | 61.3 | 68.0 | 62.7 | 71.9 | 66.7 | 67.8 | 82.5 | J/ | 64.0 |
| 100 - 159 PM | 52.9 | 70.2 | 68.5 | 75.0 | 73.3 | 71.4 | 62.8 | 74.3 | 59.6 | 66.8 | 75.2 | 72.9 | 63.9 |
| 200 - 259 PM | 56.6 | 67.6 | 71.2 | 70.5 | 71.0 | 71.7 | 68.4 | 63.6 | 55.4 | 67.3 | 74.4 | 67.6 | 65.1 |
| 300 - 359 PM | 55.5 | 62.1 | 69.4 | 67.1 | 65.2 | 76.3 | 67.5 | 70.9 | 59.1 | 67.6 | 72.2 | 76.6 | 65.7 |
| 400 - 459 PM | 54.0 | 65.9 | 68.2 | 64.7 | 58.0 | 69.6 | 58.3 | 68.4 | 60.3 | 66.2 | 74.6 | 69.9 | 61.6 |
| 500 - 559 PM | 50.6 | 60.4 | 68.1 | 71.7 | 60.5 | 63.0 | 62.7 | 57.4 | 56.0 | 60.3 | 69.1 | 71.6 | 55.9 |
| 600 - 659 PM | 52.8 | 60.4 | 65.4 | 63.5 | 60.2 | 65.9 | 53.6 | 62.6 | 54.0 | 61.1 | 69.1 | 59.2 | 63.6 |
| 700 - 759 PM | 44.7 | 64.7 | 59.6 | 66.5 | 59.9 | 67.4 | 54.3 | 66.2 | 56.6 | 63.1 | 74.0 | 58.2 | 57.2 |
| 800 - 859 PM | 49.3 | 60.0 | 58.5 | 58.1 | 56.7 | 68.9 | 61.6 | 55.5 | 49.7 | 65.5 | 67.1 | 59.6 | 57.8 |
| 900 - 959 PM | 48.7 | 59.6 | 65.4 | 71.3 | 61.9 | 60.0 | 61.9 | 62.9 | 60.3 | 66.3 | 64.7 | 68.9 | 60.1 |
| 1000 - 1059 PM | 53.8 | 63.0 | 63.4 | 50.0 | 38.3 | 68.1 | 59.5 | 57.1 | 53.9 | 60.8 | 54.9 | 64.9 | 60.9 |
| 1100 - 559 AM | 57.7 | 62.1 | 63.7 | 65.7 | 55.7 | 55.4 | 59.9 | 65.5 | 56.9 | 70.7 | 62.8 | 68.1 | 61.9 |
| TOTAL by Airport | 56.9 | 65.0 | 69.8 | 70.1 | 64.5 | 69.1 | 64.1 | 67.1 | 59.9 | 67.0 | 73.7 | 68.2 | 64.6 |

Fig. 5 - The Runway Arrival Trombone (Prior Art)
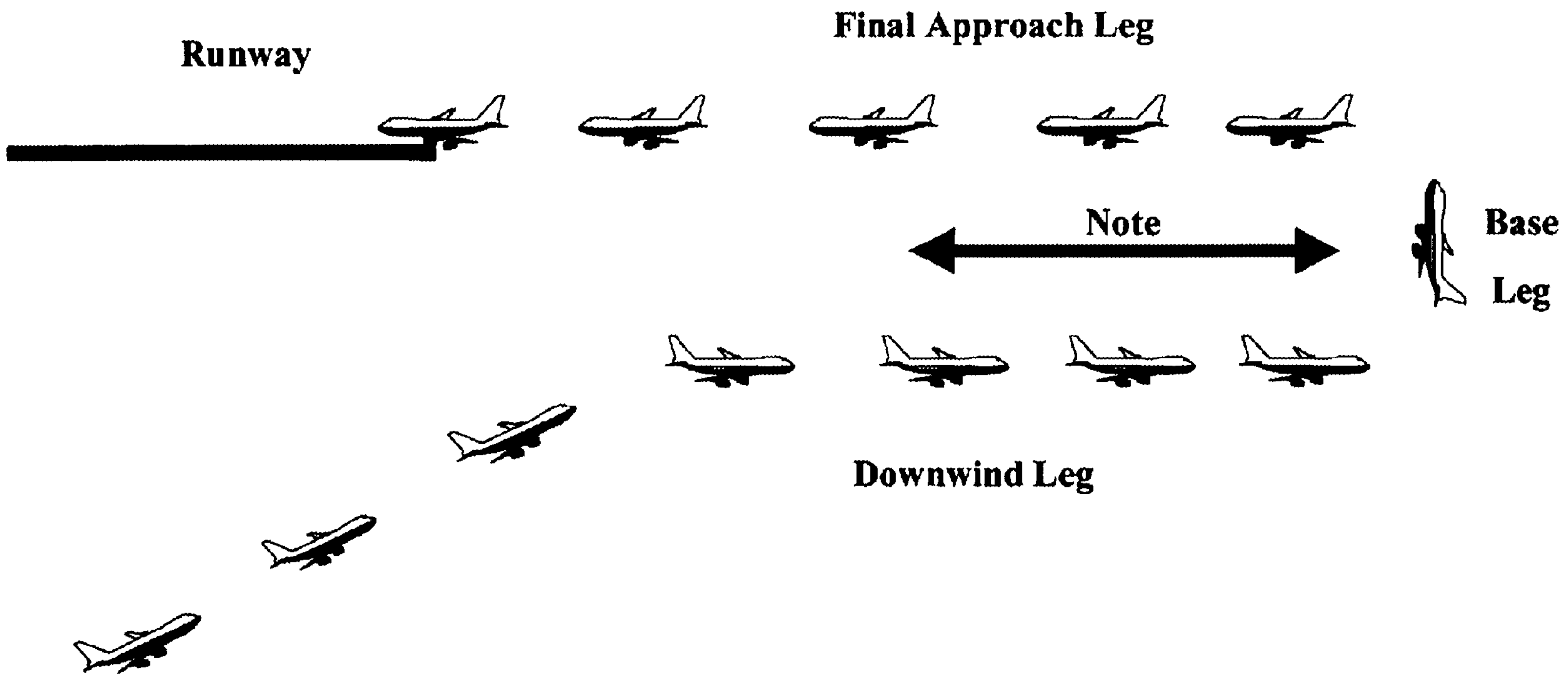
Note - Additional aircraft are warehoused by extending the distance from the base leg to the runway (i.e., extending the trombone).

Normal Arrival Spacing
Arrival/
Departure
Fix
Extended Miles-in-Trail Spacing
Arrival/
Departure
Fix

Fig. 6- Miles-In-Trail (Prior Art)
The additional miles-in-trail spacing is done by laterally extending the route or turning the aircraft.

Fig. 7 - Airborne Holding (Prior Art)
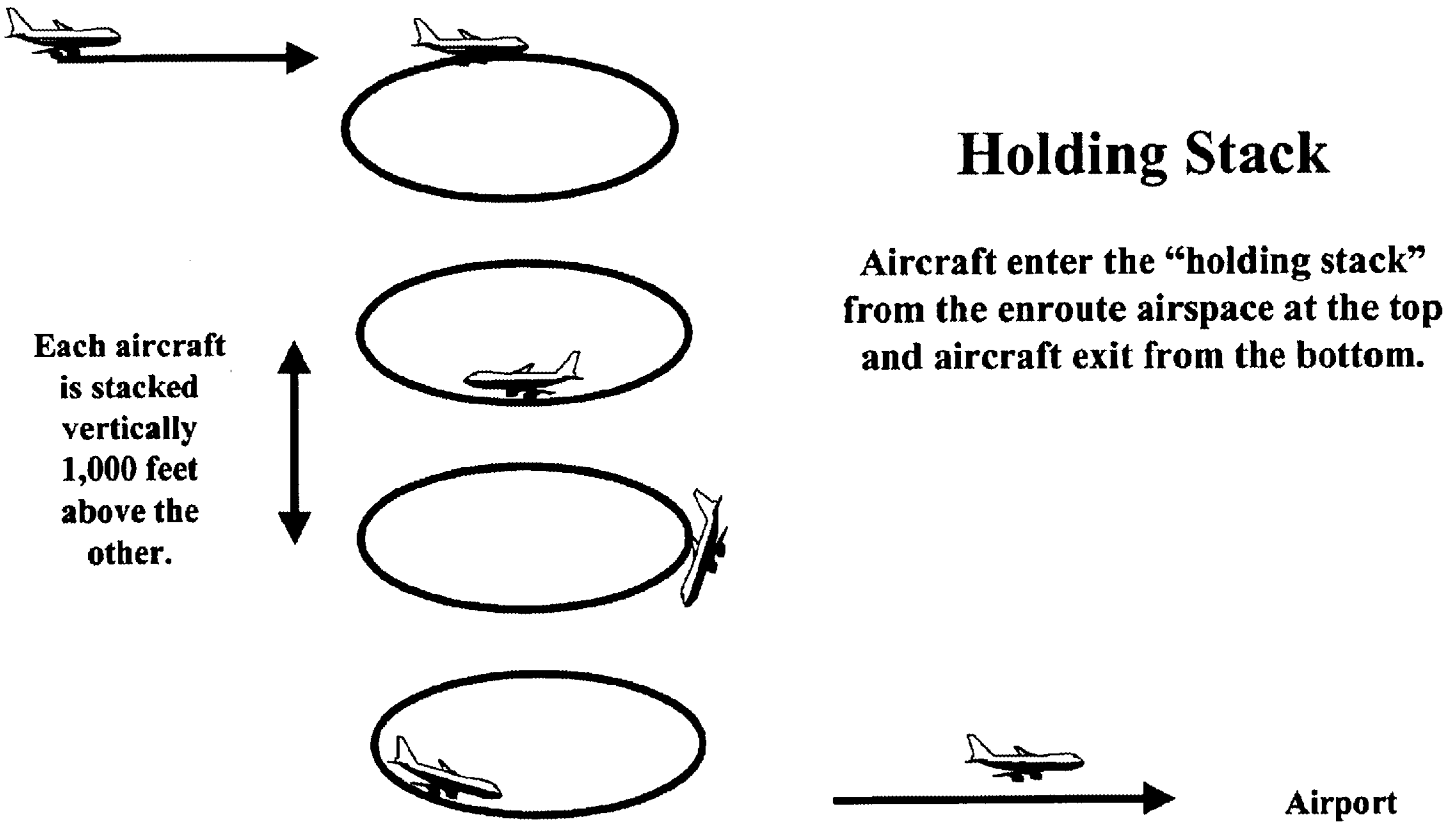

FIG. 8 - Data Sets Used in Capacity and Trajectory Prediction Process
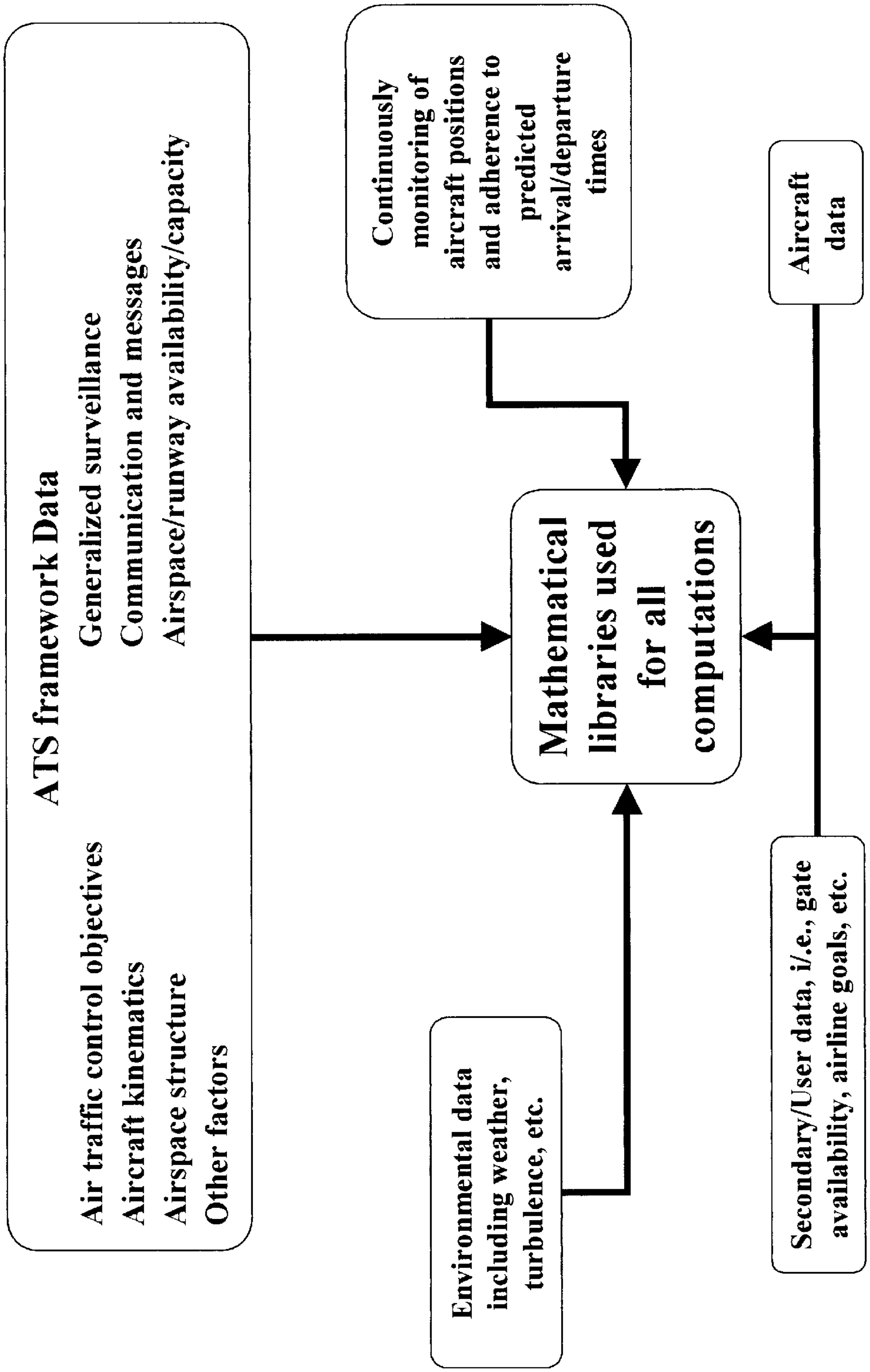

FIG. 9 - Random versus Time Sequenced Cornerpost Arrival Flow For the Same Set of Aircraft
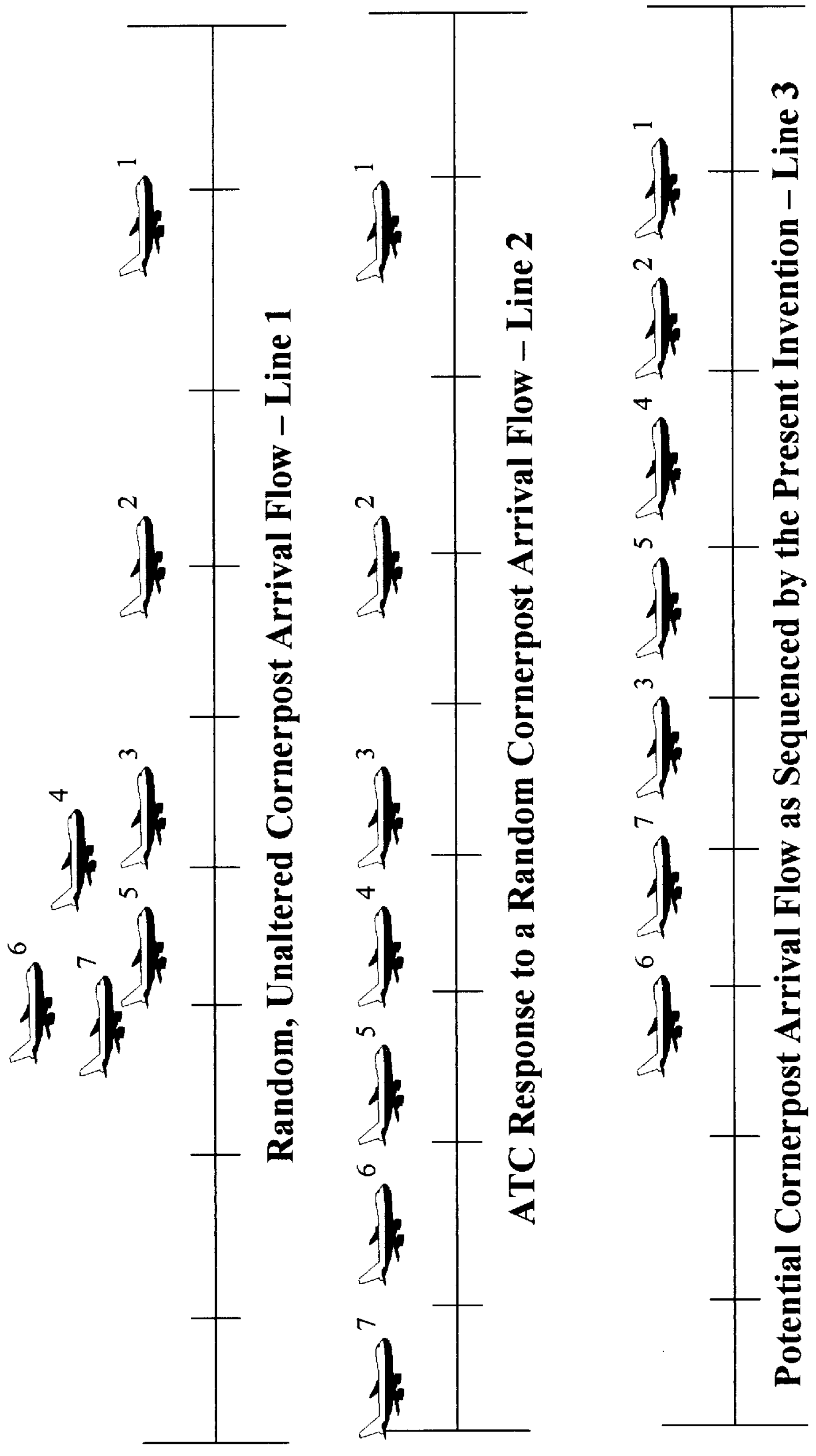

FIG. 10 – Typical Hub Arrival Schedules versus Capacity Shown In 15 Minute Blocks
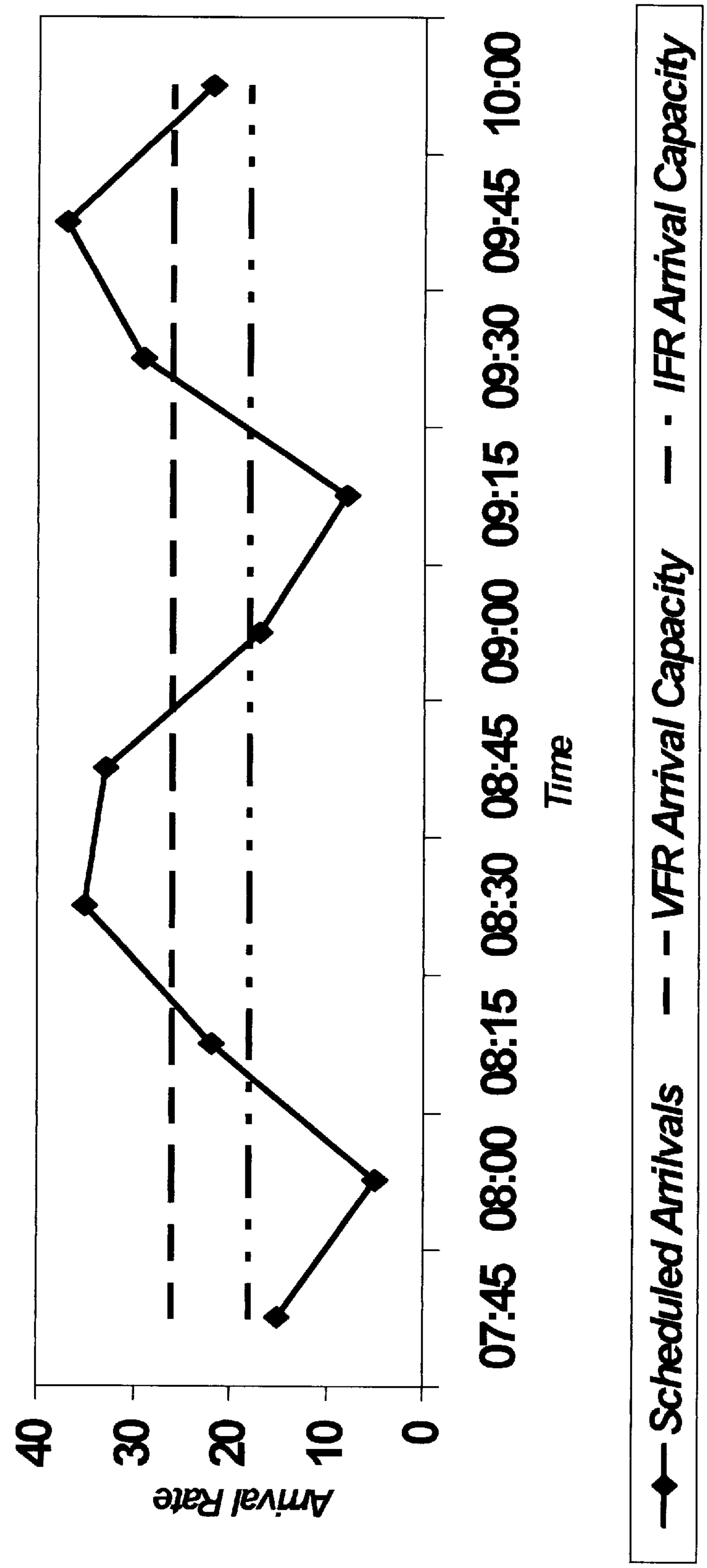

FIG. 11 – Typical Airline Production Process
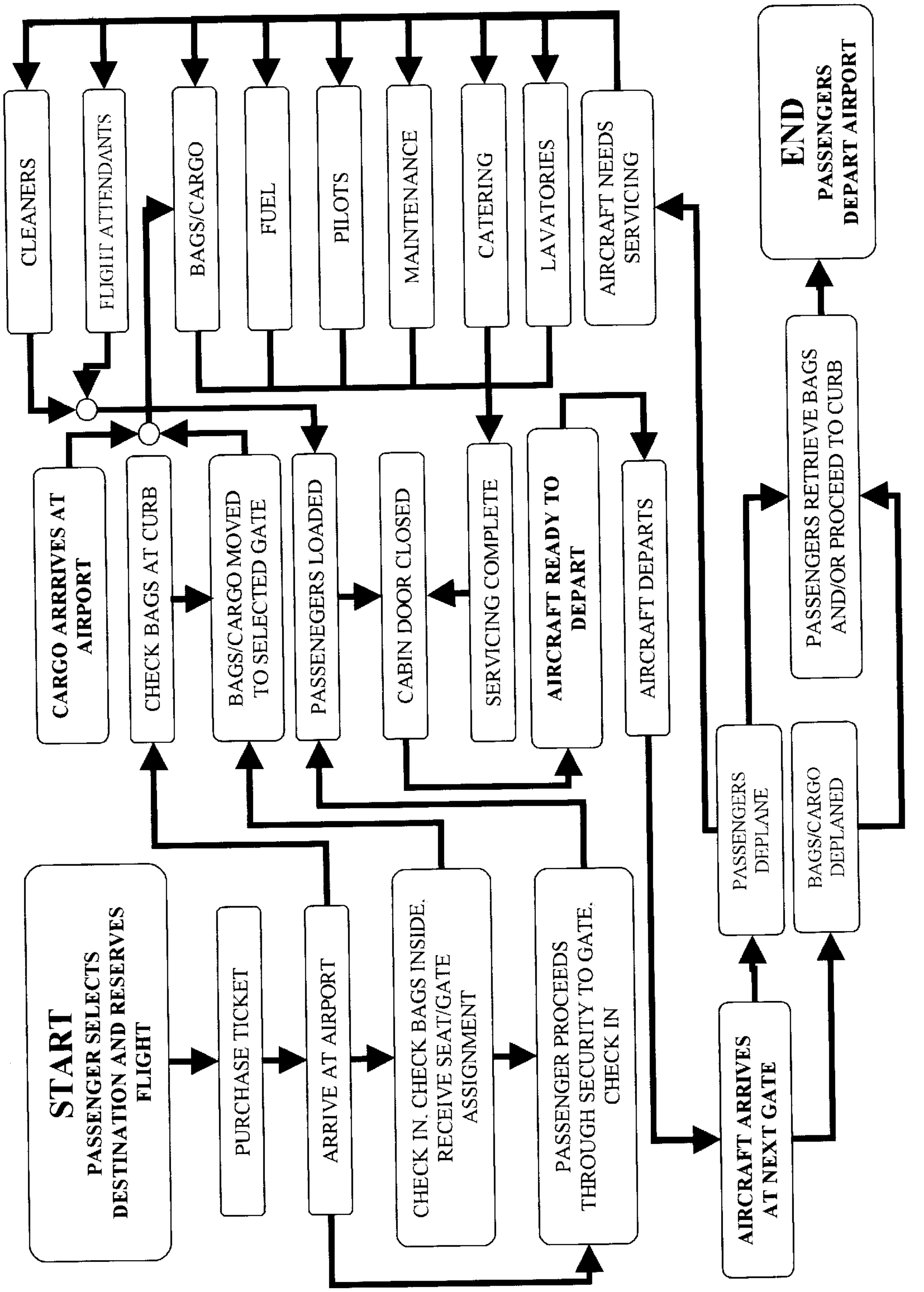

FIG. 12 – Sample Data Flow Diagram
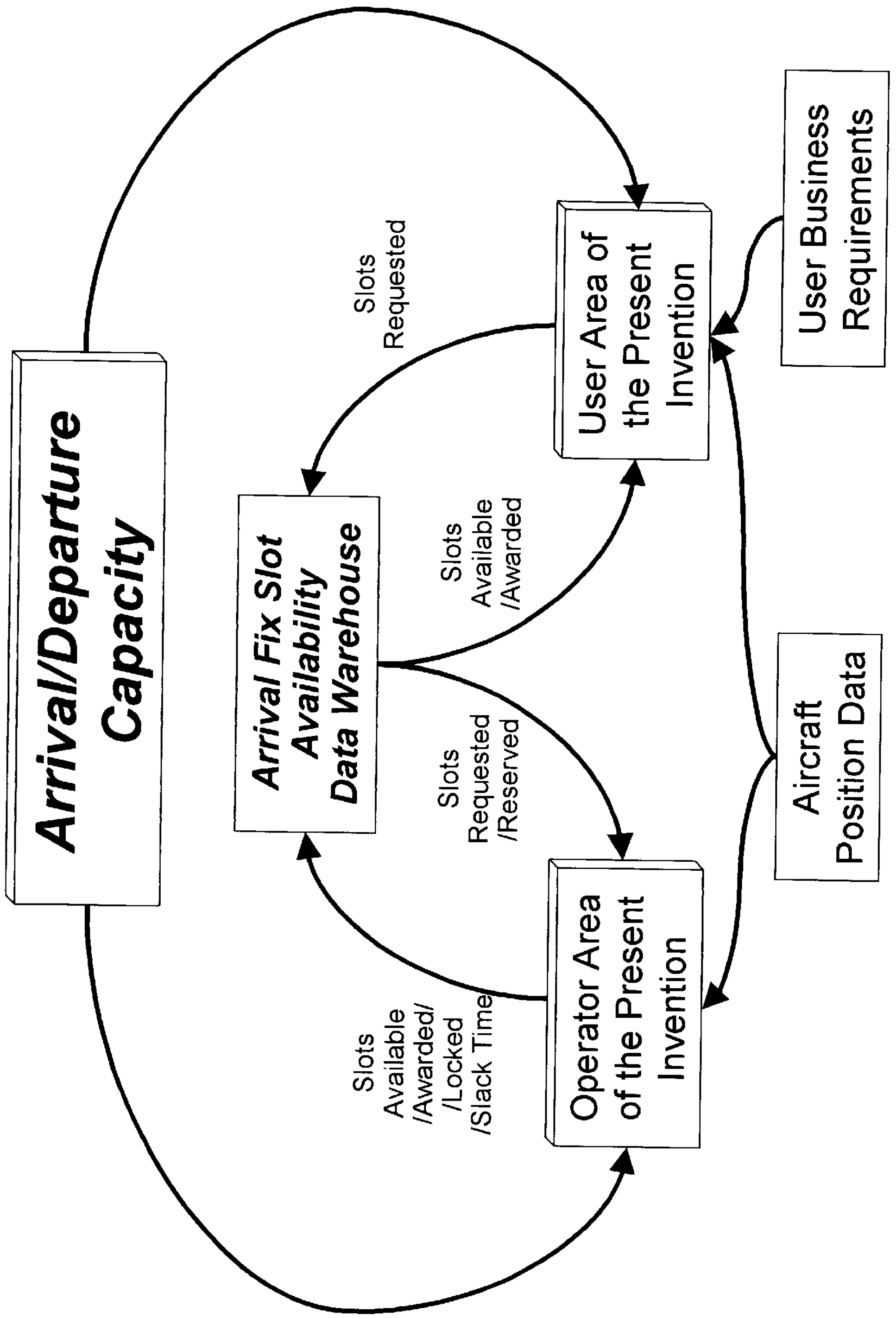

FIG. 13 – Sample Data Warehouse Depiction
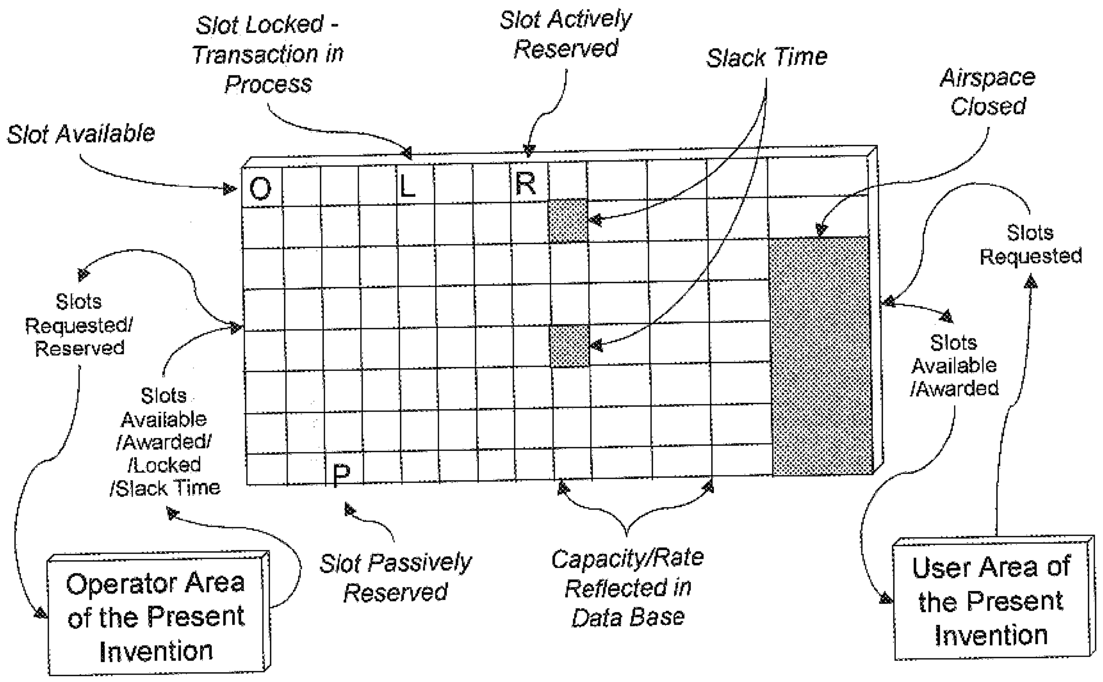

FIG. 14a - Decision/Command Matrix

Critical Factors:

1. What is the optimum airport arrival time for each aircraft as determined by the airline/user/pilot?
2. What can the airspace manager do to meet the needs of all of the aircraft approaching the airport?
3. Is the airspace infrastructure (runways, airspace, arrival fix) capable of meeting the aircraft needs taking into account available assets and the needs of all of the other aircraft?
4. What time are the control actions taken? [Note: the future trajectory prediction of all of the assets is an important aspect of this decision]
5. Decisions 1 and 2 are made by the user and passed to the Aviation Authority (if this is the operator) for integration to the present invention. Absence any information to from the airline/user/pilot, the present invention works towards safety, operational and efficiency goals.

FIG. 14b - Decision/Command Matrix

Decision 1 - Intra-Aircraft Decisions

Focus - Aircraft and User Needs and Wants

What does the individual aircraft need and/or want?

Arrival at airport at OAG Scheduled Arrival Time
Evaluate future trajectories for needs (Look Ahead)
Enough airport Time to:
- Get Passengers off/on
- Get Baggage off/on
- Get Cargo off/on
- Complete Aircraft Servicing (lavs, food, etc.)
- Complete required maintenance items
- Depart on time for next segment Enough connection time for passengers Maintenance Actions
- Scheduled maintenance
- Unscheduled repairs
- Deicing
- Known repairs Shorter route
Comfortable ride
Use Minimum Fuel
A gate upon arrival
Crew (Pilots and Flight Attendants)

Key Questions

What services does aircraft need? Regular or special?
What time does aircraft want to arrive in a perfect world?

Aircraft Characteristics

Safe Speed Range
Fuel Burn Model (fuel available to make desired change)
Wind Model
Altitude Capability (aircraft weight)

Enroute Weather Model
Enroute Turbulence Model
Aircraft position data
Fuel Burn Model (minimum fuel usage)

FIG. 14c - Decision/Command Matrix

Decision 2 - Intra-Airline Decisions

Focus - Airline Capabilities to meet needs of all aircraft

Can the airline meet the aircraft's needs?

- Gate Availability
- Jetway or Stair Availability
- Baggage Crew Availability
- Fueling Availability
- Flow of Passenger Connecting Flights
- Mechanic Availability
- Dynamic Gate Management
- Asset Trajectory Matching
- Cleaning Crew Availability
- Agent Availability
- Galley Loading/Unloading
- Parts Availability

Key Questions

- What is the airline's ability to meet the needs of all aircraft?
- Will airline service capability delay aircraft?

Airline Data

- Airport data
- Fuel truck data
- Passenger data/model
- Mechanic data
- Crew data
- Customer Service Agent data
- Galley data
- Aircraft parts data

FIG. 14d - Decision/Command Matrix

Decision 3 –Aviation Authority Decisions

Focus - Infrastructure Capabilities to meet needs of all aircraft

Can the infrastructure meet the aircraft's needs?

| | |
|---|---|
| Airspace Availability | Runway Availability |
| Arrival Fix Availability | Infrastructure Trajectory Matching |
| Weather | Demand |

Airline/pilot requirements (Decision 1 and 2 data if available)

Key Questions

What is the aviation authority's ability to meet needs of all aircraft?
Will infrastructure constraints delay aircraft?

Infrastructure Data

| | |
|---|---|
| Runway Acceptance Rate | Cornerpost Acceptance Rate |
| Weather | Equipment Status |

FIG. 14e - Decision/Command Matrix

Control Action 1 – Operator of the Present Invention

Focus - How and When to Make Control Action Happen

Control Actions

Determine a more optimal aircraft flow to arrival/departure fixes
Assure equitable access by all users to the system resource
Assign arrival/departure slot times
Transmit fix crossing time to aircraft
Monitor actions to assure aircraft response meets the new assigned goals

Key Questions

What time should control action take place?
How should pilot be notified?

FIG. 15 – Sample of the Method's Slot Allocation Processing Sequence
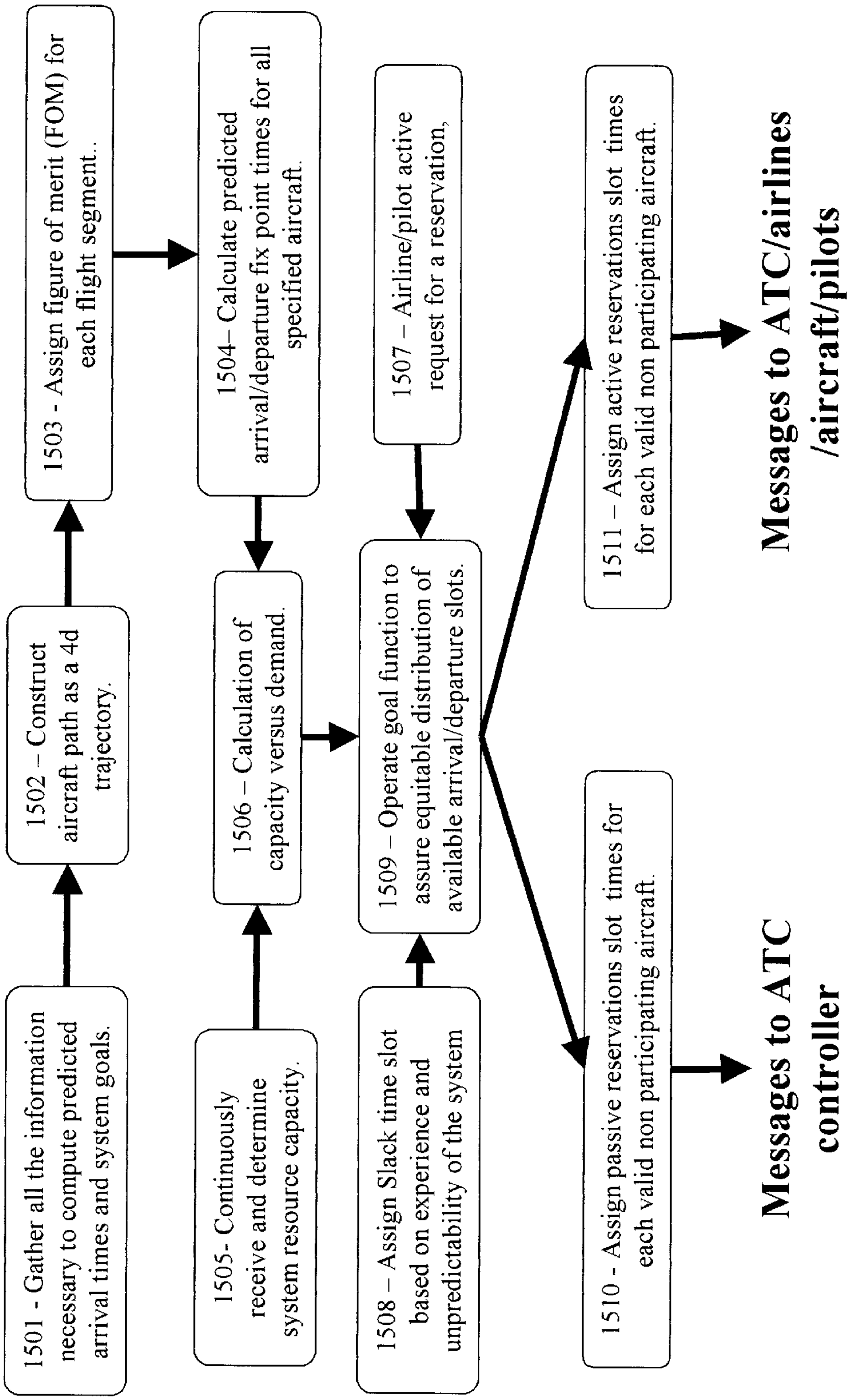

Fig. 16 - Single-aircraft Goal Function component for two aircraft (example)
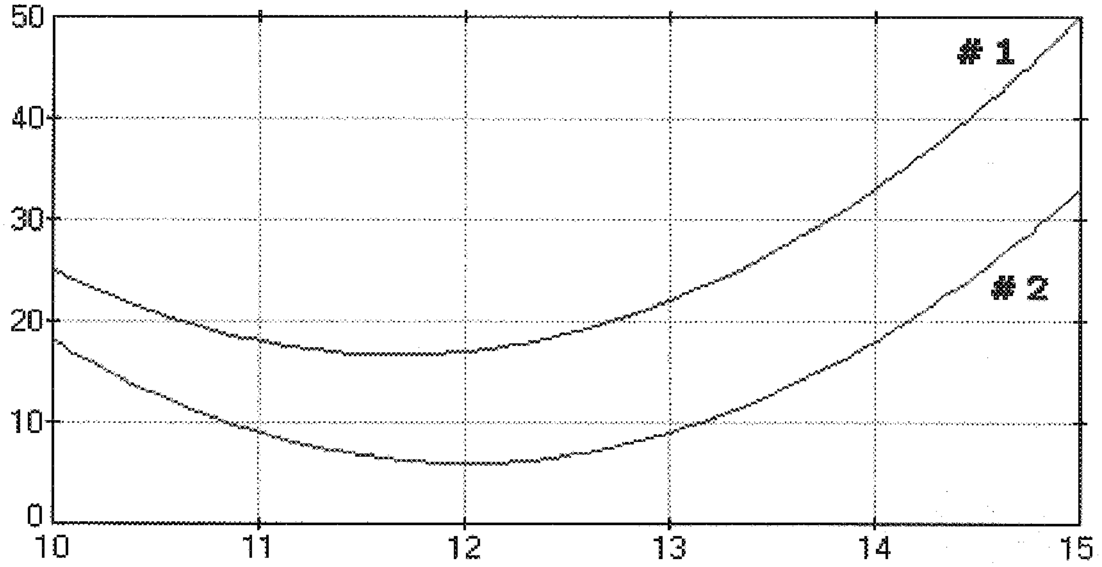

Fig. 17 - Total Goal Function for a system of two aircraft (example)

| | $t_2$= 10 | $t_2$= 11 | $t_2$= 12 | $t_2$= 13 | $t_2$=14 | $t_2$= 15 |
|---|---|---|---|---|---|---|
| $t_1$= 10 | 1043 | 34 | 31 | 34 | 43 | 58 |
| $t_1$= 11 | 36 | 1027 | 24 | 27 | 36 | 51 |
| $t_1$= 12 | 35 | 26 | 1023 | 26 | 35 | 50 |
| $t_1$= 13 | 40 | 31 | 28 | 1031 | 40 | 55 |
| $t_1$= 14 | 51 | 42 | 39 | 42 | 1051 | 66 |
| $t_1$= 15 | 68 | 59 | 56 | 59 | 68 | 1083 |

METHOD AND SYSTEM FOR ALLOCATING AIRCRAFT ARRIVAL/DEPARTURE SLOT TIMES

CROSS-REFERENCE TO RELATED APPLICATIONS

This application is related to the following U.S. Patent Applications: Provisional Application No. 60/332,614, filed Nov. 19, 2001 and entitled "Method And System For Allocating Aircraft Arrival/Departure Slot Times", Provisional Application No. 60/424,355, filed Nov. 6, 2002 and entitled "Method And System To Identify, Track And Mitigate Airborne Aircraft Threats", Regular application Ser. No. 10/238,032, filed Sep. 6, 2002 and entitled "Method And System For Tracking And Prediction of Aircraft Trajectories", Provisional Application No. 60/317,803, filed Sep. 7, 2001 and entitled "Method And System For Tracking and Prediction of Aircraft Arrival and Departure Times", U.S. Pat. No. 6,463,383 awarded Oct. 8, 2002 and entitled "Method And System For Aircraft Flow Management By Airlines/Aviation Authorities", Regular application Ser. No. 09/861,262, filed May 18, 2001 and entitled "Method And System For Aircraft Flow Management By Airlines/Aviation Authorities", Provisional Application No. 60/274,109, filed Mar. 8, 2001 and entitled "Method And System For Aircraft Flow Management By Aviation Authorities", Regular application Ser. No. 09/549,074, filed Apr. 16, 2000 and entitled "Method And System For Tactical Airline Management", Provisional Application No. 60/189,223, filed Mar. 14, 2000 and entitled "Tactical Airline Management", Provisional Application No. 60/173,049, filed Dec. 24, 1999 and entitled "Tactical Airline Management", and Provisional Application No. 60/129,563, filed Apr. 16, 1999 and entitled "Tactical Aircraft Management". All these applications having been submitted by the same applicants: R. Michael Baiada and Lonnie H. Bowlin. The teachings of these applications are incorporated herein by reference to the extent that they do not conflict with the teaching herein.

BACKGROUND OF THE INVENTION

1. Field of the Invention

The present invention relates to data processing and vehicle navigation. More particularly, this invention relates to methods and systems that allow one to better allocate and assign arrival/departure slot times for a plurality of aircraft into and out of a system resource, like an airport.

2. Description of the Related Art

The need for and advantages for tracking, prediction and asset allocation systems to better manage complex, multi-faceted processes have long been recognized. It has long been recognized by many industries that having a certain part or set of materials at a certain place at just the right time yields significant efficiencies. Thus, many complex methods for tracking and managing material flows based on the future position of particular assets as a function of time have been developed.

However, as applied to tracking, prediction and managing of aircraft within the aviation industry, such methods often have been fragmentary and too late in the process to effect the necessary change to provide real benefit. Additionally, these methods typically have not addressed the present and future movement of the aircraft, combined with other factors that can alter the aircraft's trajectory into/out of a system resource (e.g., airport).

Aviation regulatory authorities (e.g., various Civil Aviation Authorities, CAA, throughout the world, including the Federal Aviation Administration, FAA, within the U.S.) are responsible for matters such as the separation of in-flight aircraft. In this task, the CAAs collect and disseminate considerable data concerning the location of aircraft within the airspace system. This data includes: radar data, verbal position reports, data link position reports (ADS), etc. Further, airlines and other aircraft operators have developed their own flight following systems as required by the world's CAAs, which provide additional information concerning the position of the aircraft. Additionally, third parties have developed their own proprietary systems to track aircraft (e.g., Passur).

In the current art, various independent agencies, airlines or third parties use these data sources. There appears to have been few successful attempts by the various airlines/CAAs/airports/military operations/third parties to develop accurate methods and processes to manage and allocate capacity constrained resources (i.e., tactical slot allocation) that encompass all of the real-time factors (weather, ATC, individual pilot decisions, turbulence, capacity, demand, etc.) that can affect the trajectory of an aircraft. For example, in the current art of management of aircraft into an airport, it often happens that the arrival sequence is accomplished too early or too late in the arrival/departure process that actions taken have a negative effect on the efficient use of the aircraft/runway/airport assets.

An example of one of these elements is the ATC response to too many aircraft trying to land at an airport in a defined period of time. In the current art, the prediction of the aircraft arrival/departure slot time is not as accurate as possible since it is predicated only on the current aircraft position, speed, flight path and possibly winds. Yet, even with this limited information available, the arrival flow system rarely uses this information in real time to temporally manage the flow of aircraft into the airport. It is only as the aircraft nears the airport (within the last 100 to 150 miles) that the local ATC controller begins to manage the sequencing of the aircraft. And, even if the CAAs use this prediction information, it is only to limit the arrival flow based on distance sequencing of the flow (i.e., 20 miles nose to nose spacing) as opposed to the method of time based sequencing embodied in the present invention. Further, by waiting so late in the arrival process to sequence the aircraft, the controller has only one sequencing option—delays.

This process is analogous to the "take a ticket and wait" approach used in other industries. To assure equitable service to all customers, as the consumer approaches a crowded counter, the vendor sets up a ticket dispenser with numbered tickets. On the wall behind the counter is a device displaying "Now Serving" and the number. This "first come, first serve" process assures that no one customer waits significantly longer than any other customer.

The effect of the ATC's "take a ticket and wait" approach, as applied in a distance based manner and once the aircraft is near the destination airport or near the takeoff runway, is to add 1, 5, 10, 15 or more minutes to an aircraft's actual arrival time.

Only by incorporating all of the flights landing and departing at a particular airport, combined with the capacity of that airport and potential weather effects, all of which are encompassed in the present invention, can one more accurately predict, allocate and manage the arrival/departure slot times of all of the aircraft. In other words, the present invention views each aircraft as part of a system, and not individually as done within the current art.

For example, FAA's Collaborative Decision Making (CDM) program (a system to disseminate data) took a major step forward by providing both air traffic controllers and airlines with the same real time data. However, airline dispatchers, pilots, and ATC controllers are still acting mostly independently in the use of this data and are optimizing complex situations locally. Further, the competing goals of all of the different segments of the National Airspace System (NAS) often conflict, leading to confusion and wasted capacity.

For another example, a pilot may request a specific runway to save fuel and reduce taxi time even though the flight is early. The controller tries to accommodate the request and creates additional work, while blocking another aircraft that is already late from using the close in runway. As often as not, these aircraft are from the same airline.

Yet another example is when an ATC controller tries to sequence two aircraft within his sector for an arrival fix 400 miles down line. To do this, one aircraft is sped up and another slowed down or turned off course. Unfortunately, the fact that the original speeds and trajectories of each aircraft assured that the sequence at the corner post was not a problem was unknown to the local ATC controller.

To begin to understand how the current methods and system might be improved upon, it is first necessary to have a basic understanding of the various processes surrounding the flight of an aircraft. FIG. 1 has been provided to indicate the various segments in a typical aircraft flight process. It begins with the filing of a flight plan by the airline/pilot with a CAA. Next, the pilot arrives at the airport, starts the engine, taxis, takes off, flies the flight plan (e.g., route of flight), lands and taxis to parking. At each stage during the movement of the aircraft on an IFR flight plan, the CAA's Air Traffic Control (ATC) system must approve any change to the trajectory of the aircraft. Further, anytime an aircraft on an IFR flight plan is moving, an ATC controller is responsible for ensuring that an adequate separation from other IFR aircraft is maintained.

During the last part of a flight, typical initial arrival/departure sequencing is accomplished on a first come, first serve basis (e.g., the aircraft closest to the airport is first, next closest is second and so on) by the enroute ATC center near the arrival airport (within approximately 100 miles of the airport), refined by the arrival/departure ATC facility (within approximately 25 miles of the arrival/departure airport), and then approved for arrival by the local ATC tower (within approximately 5 to 10 miles of the arrival/departure airport).

For example, current CAA practices for managing arrivals at arrival/departure airports involve sequencing aircraft arrivals by linearizing an airport's traffic arrival/departure aircraft flows according to very structured, three-dimensional, aircraft arrival/departure paths, 100 to 200 miles from the airport or by holding incoming aircraft at their departure airports. For a large hub airport (e.g., Chicago, Dallas, and Atlanta), these paths involve specific geographic points that are separated by approximately ninety degrees (see FIG. 2), 30 to 50 miles from the airport. Further, if the traffic into an airport is relatively continuous over a period of time, the linearization of the aircraft flow is effectively completed hundreds of miles from landing. This can significantly restrict all the aircraft's arrival speeds and alter the expected arrival slot time, since all in the line of arriving aircraft are limited to the speed of the slowest aircraft in the line ahead.

The temporal variations in the arrival/departure slot times of aircraft into or out of an airport can be quite significant. FIG. 3 shows for the Dallas-Ft. Worth Airport the times of arrival at the airport's runways for the aircraft arriving during the thirty minute time period from 22:01 to 22:30. It can be seen that the numbers of aircraft arriving during the consecutive, five-minute intervals during this period were 12, 13, 6, 8, 6 and 5, respectively.

Further, much of the current thinking concerning the airline/ATC delay problem is that it stems from the over scheduling by the airlines of too many aircraft into too few runways. While this may be true in part, it is also the case that the many apparently independent decisions that are made by an airline's staff (i.e., pilots, customer service agents, etc.) and various ATC controllers may significantly contribute to airline/ATC delay problems. And while many of these decisions are predictable, in the current art, they have yet to be accounted for and/or coordinated in real time from a system perspective.

These delays are especially problematic since they are seen to be cumulative. FIG. 4 shows, for all airlines and a number of U.S. airports, the percentage of aircraft arriving on time during various one-hour periods throughout a typical day. This on time arrival performance is seen to deteriorate throughout the day.

The current art of aircraft arrival/departure sequencing (to assure proper aircraft separation) to an airport or other system resource, can be broken down into seven distinct tools used by air traffic controllers, as applied in a first come, first served basis, and include:

1. Structured Dogleg Arrival/Departure Routes—The structured routings into an arrival/departure are typically designed with doglegs. The design of the dogleg is two straight segments joined by an angle of less than 180 degrees. The purpose of the dogleg is to allow controllers to cut the corner as necessary to maintain the correct spacing between arrival/departure aircraft.
2. Vectoring and Speed Control—If the actual spacing is more or less than the desired spacing, the controller can alter the speed of the aircraft to correct the spacing. Additionally, if the spacing is significantly smaller than desired, the controller can vector (turn) the aircraft off the route momentarily to increase the spacing. Given the last minute nature of these actions (within 100 mile of the airport), the outcome of such actions is limited.
3. The Approach Trombone—If too many aircraft arrive at a particular airport in a given period of time, the distance between the runway and base leg can be increased; see FIG. 5. This effectively lengthens the final approach and downwind legs, allowing the controller to "store" or warehouse in-flight aircraft.
4. Miles in Trail—If the approach trombone can't handle the over demand for the runway asset, the ATC system begins spreading out the arrival/departure slot times linearly. It does this by implementing "miles-in-trail" restrictions. Effectively, as the aircraft approach the airport for arrival/departure, instead of 5 to 10 miles between aircraft on the linear arrival/departure path, the controllers begin spacing the aircraft at 20 or more miles in trail, one behind the other; see FIG. 6.
5. Ground Holds—If the separation authorities anticipate that the approach trombone and the miles-in-trail methods will not hold the aircraft overload, aircraft are held at their departure point and metered into the system using assigned takeoff times.
6. Holding—If events happen too quickly, the controllers are forced to use airborne holding. Although this can be done anywhere in the system, this is usual done at one of the arrival/departures to an airport. Aircraft enter the "holding stack" from the enroute airspace at the top; see FIG. 7. Each holding pattern is approximately 10 to 20 miles long and 3 to 5 miles wide. As aircraft exit the bottom of the stack towards the airport, aircraft orbiting above are moved down 1,000 feet to the next level.

7. Reroute—If a section of airspace, enroute center, or airport is projected to become overloaded, the aviation authority occasionally reroutes individual aircraft over a longer lateral route to delay the aircraft's entry to the predicted congestion.

CAAs current air traffic handling procedures are seen to result in significant inefficiencies and delays. Thus, despite the above noted prior art, a need continues to exist for better methods and systems to allocate and manage the arrival/departure slot times of a plurality of aircraft into and out of a system resource, like an airport.

SUMMARY OF THE INVENTION

The present invention is generally directed towards mitigating the limitations and problems identified with prior methods used to allocate arrival/departure slot times of aircraft. Specifically, the present invention is designed to more accurately, efficiently and safely manage and allocate arrival/departure slot times for aircraft.

In accordance with the present invention, a preferred embodiment of this invention takes the form of a computer program for controlling a processor to allow an aviation system to temporally allocate aircraft slot times during a specified period for the flow of a plurality of aircraft toward a specified fix point, based upon specified data pertaining to the aircraft, the fix point and associated system resources, and aviation system specified criteria for allocating the slot times.

This computer program includes: (1) a means for collecting and storing the specified data and criteria, (2) a means for processing, at a specified instant for which it is desired to allocate the slot times, the specified data applicable at that instant to each of the aircraft and associated resources so as to predict an arrival fix time for each of the aircraft at the specified fix point, (3) a means for assigning to each of the plurality of aircraft a figure of merit whose value is a measure of how likely it is that the predicted arrival fix time will be achieved by the aircraft, wherein the figure of merit having a specified value, which, when exceeded, implies that the predicted arrival time is sufficiently reliable so as to warrant the aircraft to be considered for an allocation of one of the slot times, (4) a means for accepting and storing a request by the operator of each of the aircraft for one of the slot times, (5) a means for accepting and storing a request by an operator of the present invention to create slack time in the specified period, (6) a means, utilizing the slot and slack time requests and the predicted arrival fix times for any of the plurality of aircraft for which a slot time request was not made, for predicting the demand for the slot times, (7) a means, based upon specified data that is applicable to the specified period and fix point, for predicting the availability of the slot times within the specified period, (8) a means for allocating the slot times, with this means including: (i) a means for directing a communication device, which is accessible by the aircraft operators and an operator of the present invention, to communicate the relative situation of each of the aircraft approaching the fix point versus the available slot times and the requests of the other operators, (ii) a means for comparing the demand for, versus the availability of, slot times to determine whether a conflict exists for a slot time, (iii) a means for identifying and evaluating alternative ways to resolve conflicts for the slot times, (iv) a means which considers the alternative ways to resolve slot time conflicts and yields a recommendation for resolving the conflict, (v) a means for communicating the recommended conflict resolution to the affected operators, (vi) a means for collecting and storing the input of the operators pertaining to the allocation of the slot times, and (vii) a means, responsive to the requests and the operator input, for allocating the slot times, (9) a means that facilitates the trading of the allocated slot times among the aircraft operators, and (10) when the specified data is temporally varying, the computer program further includes: (i) a means for monitoring the ongoing temporal changes in the specified data so as to identify temporally-updated specified data, (ii) a means for updating the arrival fix times for each of the aircraft to which the temporally-updated specified data applies, (iii) a means for updating the predicted demand for and availability of slot times based upon the updated arrival fix times, and (iii) a means for updating the allocations based upon the updated predictions of the demand for and availability of slot times.

In another preferred embodiment, the present invention takes the form of a method that allows an aviation system to temporally allocate aircraft slot times during a specified period for the flow of a plurality of aircraft toward a specified fix point, based upon specified data pertaining to the aircraft, the fix point and associated system resources, and aviation system specified criteria for allocating the slot times.

This method includes the steps of (1) collecting and storing the specified data and criteria, (2) processing, at a specified instant for which it is desired to allocate the slot times, the specified data applicable at that instant to each of the aircraft and associated resources so as to predict an arrival fix time for each of the aircraft at the specified fix point, (3) assigning to each of the plurality of aircraft a figure of merit whose value is a measure of how likely it is that the predicted arrival fix time will be achieved by the aircraft, wherein the figure of merit having a specified value, which, when exceeded, implies that the predicted arrival time is sufficiently reliable so as to warrant the aircraft to be considered for an allocation of one of the slot times, (4) accepting and storing a request by the operator of each of the aircraft for one of the slot times, (5) accepting and storing a request by the airline system to create slack time in the specified period, (6) predicting, utilizing the slot and slack time requests and the predicted arrival fix times for any of the plurality of aircraft for which a slot time request was not made, the demand for the slot times, (7) predicting, based upon specified data that is applicable to the specified period and fix point, the availability of the slot times within the specified period, and (8) allocating, based upon the operator requests, predicted demand for and availability of the slot times and the slot time allocation criteria, the slot times.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

OBJECTS AND ADVANTAGES

To better understand the invention disclosed herein, it is instructive to consider the objects and advantages of the present invention.

It is an object of the present invention to temporally manage the flow of aircraft through the allocation of arrival/ departure slot times, rather than through the application of distance-based sequencing or by temporally denying access to the entire system.

It is another object of the present invention to build a network where users can claim, alter, exchange, etc. arrival/departure slots in real time.

It is yet another object of the present invention to provide a method and system to better allocate aircraft arrival/departure slot times for x hours into the future (i.e., 1 32 to 24 hours), with respect to a plurality of aircraft at a specified system resource, like an arrival/departure fix, runway, airport, airway, airspace, ATC sector or set of resources, thereby overcoming the limitations of the prior art described above.

It is still another object of the present invention to present a method and system for the real time tracking and prediction of aircraft that takes into consideration a wider array of real time parameters and factors that heretofore were not considered. For example, such parameters and factors may include: aircraft related factors (e.g., speed, fuel, altitude, route, turbulence, winds, weather), ground services (gates, maintenance requirements, crew availability, etc.) and common asset availability (e.g., runways, airspace, Air Traffic Control (ATC) services).

It is a further object of the present invention to provide a method and system that will enable the airspace users to better manage their aircraft.

It is a still further object of the present invention to temporally allocate the arrival/departure slot times of aircraft into or out of a specific system resource in real time. Further, if the outcome of events alters demand or capacity for that system resource, it is then the object of the present invention to account for these problems in the arrival/departure allocations within the present invention such that arrival/departure slot times are reallocated so as to more efficiently use the constrained resource.

These and other objects and advantages of the present invention will become readily apparent, as the invention is better understood by reference to the accompanying drawings and the detailed description that follows.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIG. 1 presents a depiction of a typical aircraft flight process.

FIG. 2 illustrates typical arrival/departure slot times from a busy airport.

FIG. 3 illustrates an arrival/departure bank of aircraft at Dallas/Ft. Worth airport collected as part of NASA's CTAS project.

FIG. 4 illustrates the December 2000, on-time arrival/departure performance at sixteen specific airports for various one hour periods during the day.

FIG. 5 presents a depiction of the arrival/departure trombone method of sequencing aircraft.

FIG. 6 presents a depiction of the miles-in-trail method of sequencing aircraft.

FIG. 7 presents a depiction of the airborne holding method of sequencing aircraft.

FIG. 8 illustrates the various types of data that are used in the process of the present invention.

FIG. 9 illustrates the difference between a random arrival/departure aircraft flow (line 1) versus the expected ATC response to such arrival/departure flow (line 2—current art) and a time sequenced aircraft flow with allocated fix slot times (line 3—present invention).

FIG. 10 illustrates a typical aircraft arrival/departure demand versus available IFR and VFR capacity at a typical hub airport. The graph is broken down into 15 minute blocks of time.

FIG. 11 illustrates a typical airline production process.

FIG. 12 illustrates the flow of data within the present invention

FIG. 13 illustrates an example of the present invention that allows for actively and passively reserving arrival/departure slots at a constrained resource.

FIGS. 14*a*–14*e* illustrates an Airline/User & Aviation Authority Aircraft Arrival/Departure Slot Time Requirement/Capacity Matrix.

FIG. 15 illustrates an example of the present invention's slot allocation processing sequence.

FIG. 16 illustrates an example of a single-aircraft Goal Function component for two aircraft.

FIG. 17 illustrates an example of a Total Goal Function for a system of two aircraft.

Definitions

ACARS—ARINC Communications Addressing and Reporting System is a discreet data link system between the aircraft and ground personnel. This provides very basic email capability between the aircraft and ground personnel, along with allowing the aircraft automatic access to limited sets of operational data. Examples of available operational data includes: weather data, airport data, OOOI data, etc.

Aircraft Situational Data (ASD)—This an acronym for a real time data source (approximately 1 to 5 minute updates) provided by the world's aviation authorities, including the Federal Aviation Administration, comprising aircraft position and intent for the aircraft flying over the United States and beyond.

Aircraft Trajectory—The movement or usage of an aircraft defined as a position and time (past, present or future). For example, the trajectory of an aircraft is depicted as a position, time and intent. This trajectory can include in flight positions, as well as taxi positions, and even parking at a specified gate or parking spot.

Airline—a business entity engaged in the transportation of passengers, bags and cargo on an aircraft.

Airline Arrival Bank—A component of a hub airline's operation where numerous aircraft, owned by the hub airline, arrive at a specific airport (hub airport) within in a very short time frame.

Airline Departure Bank—A component of a hub aviation's operation where numerous aircraft, owned by the hub airline, depart from a specific airport (hub airport) within a very short time frame.

Airline Gate—An area or structure where aircraft owners/airlines park their aircraft for the purpose of loading and unloading passengers and cargo.

Air Traffic Control System (ATC)—A system to assure the safe separation of moving aircraft operated by an aviation regulatory authority. In numerous countries, the Civil Aviation Authority (CAA) manages this system. In the United States the federal agency responsible for this task is the Federal Aviation Administration (FAA).

Arrival/Departure Times—Refers to the time an aircraft was, or will be at a certain point along its trajectory. While the arrival/departure time at the gate is commonly the main point of interest for most aviation entities and airline customers, the arrival/departure time referred to herein can refer to the arrival/departure time at or from any point of interest along the aircraft's present or long trajectory.

Arrival/departure fix—At larger airports, the aviation regulatory authorities have instituted structured arrival/departure points that force all arrival/departure aircraft over geographic points (typically four for arrivals called cornerposts and four or more for departures—see FIG. 2). These are typically 30 to 50 miles from the arrival/departure airport and are separated by approximately 90 degrees. The purpose of these arrival/departure points or cornerposts is so that the controllers can better sequence the aircraft, while keeping them separate from the other arrival/departure aircraft flows. In the future it may be possible to move these merge points closer to the airport, or eliminate them all together. As described herein, the arrival/departure fix is typically a point where aircraft merge, but as referred to herein can mean any specified point along the aircraft's trajectory. Additionally, as referred to herein, an arrival/departure fix can refer to entry/exit points to any system resource, e.g., a runway, an airport gate, a section of airspace, a CAA control sector, a section of the airport ramp, etc. Further, an arrival/departure fix/cornerpost can represent an arbitrary point in space where an aircraft is or will be at some past, present or future time.

Asset—To include assets such as aircraft, airports, runways, and airspace, flight jetway, gates, fuel trucks, lavatory trucks, and other labor assets necessary to operate all of the aviation assets.

Automatic Dependent Surveillance (ADS)—A data link surveillance system currently under development. This system, which is installed on the aircraft, captures the aircraft position and then communicates it to the CAA/FAA, other aircraft, etc.

Aviation Authority—Also aviation regulatory authority. This is the agency responsible for aviation safety along with the separation of aircraft when they are moving. In the US, this agency is the Federal Aviation Administration (FAA). In numerous other countries, it is referred to as the Civil Aviation Authority (CAA). Typically, this is a government-controlled agency, but a recent trend for the separation of aircraft is to privatize this function.

Block Time—The time from aircraft gate departure to aircraft gate arrival. This can be either scheduled block time (scheduled departure time to scheduled arrival/departure time as posted in the airline schedule) or actual block time (time difference between when the aircraft door is closed and the brakes are released at the departure station until the brakes are set and the door is open at the arrival station).

CAA—Civil Aviation Authority. As used herein is meant to refer to any aviation authority responsible for the safe separation of moving aircraft, including the FAA within the US.

Cooperative Decision-Making (CDM)—A program between FAA and the airlines wherein the airlines provide the FAA a more realistic real time schedule of their aircraft. For example if an airline cancels 20% of its flights into a hub because of bad weather, it would advise the FAA. In turn, the FAA compiles the data and redistributes it to all participating members.

Common Assets—Assets that must be utilized by all of the airspace/airport/runway users and which are usually controlled by the aviation authority (e.g., CAA, FAA, airport). These assets (e.g., runways, ATC system, airspace, etc.) are not typically owned by any one airspace user.

CTAS—Center Tracon Automation System—This is a NASA developed set of tools (TMA, FAST, etc.) that seeks to temporally track and manage the flow of aircraft from approximately 150 miles from the airport to arrival/departure.

Federal Aviation Administration—The government agency responsible for the safe separation of aircraft while they are moving in the air or on the ground within the United States.

Figure of Merit (FOM)—A method of evaluating the accuracy of a piece of data, data set, calculation, etc. It also is a method to represent the confidence, i.e. degree of certainty; the system has in the data, trajectory and/or prediction.

Four-dimensional Path—The definition of the movement of an object in one or more of four dimensions—x, y, z and time.

Goal Function—a method or process of measurement of the degree of attainment for a set of specified goals. A method or process to evaluate the current scenario against a set of specified goals and generate various alternative scenarios. Then, using all of the available generated scenarios, identify which of these scenarios will yield the highest degree of attainment for a set of specified goals. The purpose of the Goal function is to find a solution that "better" meets the specified goals (as defined by the operator) than the present condition and determine if it is worth (as defined by the operator) changing to the "better" condition/solution. This is always true, whether it is the initial run or one generated by the monitoring system. In the case of the monitoring system (and this could even be set up for the initial condition/solution as well), it is triggered by some defined difference (as defined by the operator) between how well the present condition meets the specified goals versus some "better" condition/solution found by the present invention. Once the Goal function finds a "better" condition/solution that it determines is worth changing to, a process translates said "better" condition/solution into some doable task and then communicates this to the interested parties, and then monitors the new current condition to determine if any "better" condition/solution can be found and is worth changing again.

Hub Airline—An airline operating strategy whereby passengers from various cities (spokes) are funneled to an interchange point (hub) and connect to flight to various other cities. This allows the airlines to capture greater amounts of traffic flow to and from cities they serve, and offers smaller communities one-stop access to literally hundreds of nationwide and worldwide destinations.

IFR—Instrument Flight Rules. A set of flight rules wherein the pilot files a flight plan with the aviation authorities responsible for separation safety. Although this set of flight rules is based on instrument flying (e.g., the pilot references the aircraft instruments) when the pilot cannot see at night or in the clouds, the weather and the pilot's ability to see outside the aircraft are not a determining factors in IFR flying. When flying on a IFR flight plan, the aviation authority (e.g., ATC controller) is responsible for the separation of the aircraft when it moves.

Long-Trajectory—The ability to look beyond the current flight segment to build the trajectory of an aircraft or other aviation asset (i.e., gate) for x hours (typically 24) into the future. This forward looking, long-trajectory may include numerous flight segments for an aircraft, with the taxi time and the time the aircraft is parked at the gate included in this trajectory. For example, given an aircraft's current position and other factors, it is predicted to land at ORD at 08:45, be at the gate at 08:52, depart the gate at 09:35, takeoff at 09:47 and land at DCA at 11:20 and be at the DCA gate at 11:31. At each point along this long trajectory, numerous factors can influence and change the trajectory. The more accurately the present invention can predict these factors, the more accurately the prediction of each event along the long trajectory. Further, within the present invention, the long-trajectory is used to predict the location of an aircraft at any point x hours into the future.

OOOI—A specific aviation data set comprised of; when the aircraft departs the gate (Out), takes off (Off), lands (On), and arrives at the gate (In). These times are typically automatically sent to the airline via the ACARS data link, but could be collected in any number of ways.

PASSUR—A passive surveillance system usually installed at the operations centers at the hub airport by the hub airline. This proprietary device allows the airline's operational people on the ground to display the airborne aircraft in the vicinity (up to approximately 150 miles) of the airport where it is installed. This system has a local capability to predict landing times based on the current flow of aircraft, thus incorporating a small aspect of the ATC prediction within the present invention.

Strategic Tracking—The use of long range information (current time up to "x" hours into the future, where "x" is defined by the operator of the present invention, typically 24 hours) to determine demand and certain choke points in the airspace system along with other pertinent data as this information relates to the trajectory of each aircraft to better predict multi segment arrival/departures times for each aircraft.

System Resource—a resource like an airport, runway, gate, ramp area, or section of airspace, etc, that is used by all aircraft. A constrained system resource is one where demand for that resource exceeds capacity. This may be an airport with 70 aircraft that want to land in a single hour, with arrival/departure capacity of 50 aircraft per hour. Or it could be an airport with 2 aircraft wanting to land at the same exact time, with capacity of only 1 arrival/departure at a time. Or it could be a hole in a long line of thunderstorms that many aircraft want to utilize. Additionally, this can represent a group or set of system resources that can be tracked and predicted simultaneously. For example, an arrival/departure cornerpost, runaway and gate represent a set of system resources that can be tracked and predictions made as a combined set of resources to better predict the arrival/departure times of aircraft.

Tactical Tracking—The use of real time information (current time up to "n1" minutes into the future, where "n1" is defined by the operator of the present invention, typically 1 to 3 hours) to predict single segment arrival/departure times for each aircraft.

Trajectory—See aircraft trajectory and four-dimensional path above.

VFR—Visual Flight Rules. A set of flight rules wherein the pilot may or may not file a flight plan with the aviation authorities responsible for separation safety. This set of flight rules is based on visual flying (e.g., the pilot references visual cues outside the aircraft) and the pilot must be able to see and cannot fly in the clouds. When flying on a VFR flight plan, the pilot is responsible for the separation of the aircraft when it moves.

DESCRIPTION OF THE PREFERRED EMBODIMENT

Before explaining at least one embodiment of the present invention in detail, it is to be understood that the invention is not limited in its application to the arrangements of the component parts or process steps set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention generally relates to methods for more accurately, efficiently and safely managing and allocating temporal arrival/departure slot times for a plurality of aircraft into or out of an aviation system resource, like an airport. For ease of understanding, the following description is based on the allocation of a single aircraft's slot time at an arrival fix near an airport.

In a preferred embodiment, an aircraft's arrival time slot is allocated by the present invention based upon consideration of specified data regarding many factors, including: the aircraft position, aircraft performance, capacity of the airport and arrival/departure paths, environmental factors, predicted ATC actions, and airline and pilot requirements.

Several, seemingly independent, process tasks or steps may be involved in the present invention's allocation of slot times. These steps include:

(a) An asset trajectory tracking (e.g., three spatial directions and time) process that monitors the position and status of all aircraft and other assets of the system, (b) An asset current trajectory predicting process that predicts for the time period consisting of the current flight segment the asset's future position or usage and status, (c) A long trajectory management process that generates/allocates arrival/departure fix times for each aircraft's current and follow-on flight segments, (d) An environmental impact evaluation process that predicts how environmental factors (weather, turbulence, etc.) will alter the initially allocated aircraft arrival/departure slot times and then directs that any necessary trajectory changes be made so that allocated slot times can be met, or, if this is not possible, suggests alternative slot times that most efficiently and effectively utilize the system's resources/assets, (e) A capacity identification and calculation process that looks at all of the system resources and other airspace related assets to determine availability of said assets so that allocated slot times can be met, or, if this is not possible, initiates action that leads to the identification of alternative slot times that most efficiently and effectively utilize the system's resources/assets, (f) An ATC impact assessment process that looks at all of the arriving/departing aircraft, airport capacity versus demand and other airspace related issues and predicts how expected ATC actions will impact the aircrafts' ability to meet initially allocated slot times, or, if this is not possible, initiates action that leads to the identification of alternative slot times that most efficiently and effectively utilize the system's resources/assets, (g) An optional validation and approval process, which entails an airline/CAA or other system operator validating the practicality and feasibility of the predicted arrival/departure fix times, (h) A reservation process that allocates constrained resources fairly and equitably to all users, (i) A communication process which involves an airline/CAA, other system operator or automated process communicating these assigned arrival/departure slot times to the aircraft and all other interested parties, and (j) A closed loop monitoring process, which involves continually monitoring the current state of the aircraft and other factors.

This monitoring process measures the current state of the aircraft against their initially assigned arrival/departure slot times. If at anytime the actions or change in status of one of the aircraft or other system resource assets would change the current arrival/departure slot times beyond a specified value, the system operator can be notified, or the system can automatically be triggered, at which time more accurate arrival/departure slot times for the aircraft can be coordinated and communicated to all appropriate personnel.

This method is seen to avoid the pitfall of managing arrival/departure slot times too late or too early as is done within the current art.

For the sake of brevity, the following explanatory discussion involves only the aircraft movement aspects into a single arrival fix. It should be understood that the present invention works as well with the arrival/departure slot times of aircraft into or out of any aviation system resource or set of sequentially accessed resources (e.g., airspace, runways, gates, ramps, etc.).

FIG. 8 illustrates the various types of data sets that are used in the present invention, these include: air traffic control objectives, generalized surveillance, aircraft kinematics, communication and messages, airspace structure, airspace and runway availability, user requirements (if available), labor resources, aircraft characteristics, scheduled arrival and departure times, weather, gate availability, maintenance, other assets, and safety, operational and efficiency goals.

As discussed above, in the current art, the arrival/departure slot times of aircraft are random and based on numerous independent decisions, which leads to wasted runway capacity. For example, FIG. 9 shows two different distributions of the same arrival flow. The first line shows the predicted unaltered slot times of seven aircraft at the arrival fix. Recognizing that the arrival fix can only accommodate one aircraft at a time, they must be linearized in some manner. Line two shows a typical distribution of an ATC response to line one. In line two, the aircraft are distributed in a "first come, first served" manner. Aircraft #1 and #2 are left alone, while aircraft #4 through #7 are pushed backward in time in order.

In line 3, the aircraft arrival fix times are altered by the present invention to better meet the demands of the users, while still meeting safety and efficiency requirements. In this example, rather than applying a "first come, first served" solution as is done in the current art, the present invention has the ability to alter the sequence so as to improve the business solution of all users. Further, not only is the arrival sequence altered, the entire arrival sequence is moved forward in time, a unique aspect of the present invention.

This is possible because of the timeframe in which the present invention operates. Rather than waiting until 10 to 20 minutes prior to the arrival fix, as is typically done in the current art, the present invention determines and implements a more optimal arrival sequence and flow 1 to 2 hours or more prior to the arrival fix.

The present invention contributes to reducing wasted runway capacity by identifying potential arrival/departure bunching or wasted capacity early in the process, typically one to three hours (or more) before arrival such that an arrival slot time can be requested and coordinated to mitigate the negative aspects of the current art.

Given below are further examples of what can be accomplished by the use of the present invention:

EXAMPLE 1

In the current art, after the aircraft takes off, the enroute speed is typically left to the pilot. As depicted in FIG. 9, this leads to a random flow of aircraft as they approach the airport. Yet, as soon as the aircraft leave the gate at the point of departure, an accurate prediction of the arrival time can be calculated based on the currently available data.

With this data, the airline can calculate the optimal arrival fix slot time based on the airline's internal needs (see FIGS. 14*b* and 14*c*). With an optimal arrival fix time, the airline can log onto a data screen generated by the present invention and reserve this arrival slot, or if this slot is occupied, it can reserve a slot close to the optimal slot.

EXAMPLE 2

When weather at an airport is expected to deteriorate to the point such that the rate of arrival/departures is lowered, the aviation authorities will "ground hold" aircraft at their departure points. Ground holds hold the aircraft at the point of departure, even though the actual problem is thousands of miles away. Once allowed to depart, many pilots speed up, which increases fuel burn and costs, while negating some portion of the ground hold. Additionally, the ground hold process does not alter the random arrival flow, which is still left for the arrival ATC controller to solve.

Further, because of rapidly changing conditions and the difficulty of communicating to numerous aircraft that are being held on the ground, it happens that expected one to two hour delays change to 30 minute delays, and then to being cancelled altogether within a fifteen minute period. Also, because of various uncertainties, it may happen that by the time the aircraft arrives at its destination, the constraint to the airport's arrival/departure rate is long since past and the aircraft is sped up for arrival/departure. This leads to many uncertainties, unpredictable flow of aircraft at the destination and wasted available capacity. An example of this scenario occurs when a rapidly moving thunderstorm, which clears the airport hours before the aircraft, is scheduled to land.

In an embodiment of the present invention, if an airport arrival/departure rate is expected to deteriorate to the point such that the rate of arrival/departures is lowered, the present invention calculates arrival/departure slot times (near the arrival airport, i.e., the actual constraint) for arriving aircraft based on a large set of parameters, including the predicted arrival/departure rate. Once this reduced arrival/departure capacity is posted on the present invention, airlines can request and be assigned their slot time reservations. This allows the aircraft to takeoff as the pilot/airline deems necessary and fly a minimum cost routing to the destination.

As illustrated by the above example, a goal of the present invention is to manage access to the problem, not limit access to the system, thus moving the aircraft flow to a pull system instead of a push system.

EXAMPLE 3

Numerous aviation delays are caused by the unavailability of an arrival/departure gate or parking spot. Current airline/ airport practices typically assign gates either too early (e.g., months in advance) and only make modifications after a problem develops, or too late (e.g., when the aircraft lands). In an embodiment of the present invention, gate availability, as provided by the airline/airport, is integrated into the airline internal optimization process. By integrating the real time gate availability into the tracking and prediction of the present invention, it becomes possible to more accurately choose a better arrival/departure slot time that meets the internal needs of the airline.

EXAMPLE 4

Given the increased predictability of the aircraft arrival/departure slot time, the process of the present invention helps the airlines/users/pilots to more efficiently sequence the ground support assets such as gates, fueling, maintenance, flight crews, etc.

EXAMPLE 5

The current thinking is that the airline delay/congestion problem arises from airline schedules that are routinely over airport capacity. The use of the present invention works to alert the system operator to real time capacity overloads, allowing the operator to apply corrections in the arrival flow. One such system (U.S. Pat. No. 6,463,383 issued Oct. 8, 2002 and entitled "Method And System For Aircraft Flow Management By Airlines/Aviation Authorities" and Regular application Ser. No. 09/549,074, filed Apr. 16, 2000 and entitled "Tactical Airline Management") does this by moving aircraft both forward and backward in time from a system perspective.

Take the example of the arrival/departure demand versus capacity at a typical hub airport as shown in FIG. 10. During the day, the airport has eight arrival/departure banks that are scheduled above the airport capacity. For example, at 8:00 demand is below capacity, but by 8:30, the scheduled arrival/departure demand exceeds capacity by 9 aircraft in good weather and 17 aircraft in poor weather. And then by 9:00, demand is below capacity again. It is one embodiment of the present invention to allocate arrival/departure slot times to flatten the arrival bunching forward and backward in time in an intelligent manner so as to better manage this actual over capacity in real time.

EXAMPLE 6

Consider the case of aircraft flow involving a bank arrival (i.e., 30 to 50 aircraft of the same airline) plus aircraft from other airlines converging towards a single airport in a short period of time. For the sake of brevity, only three aircraft will be looked at in detail, two from the hub airline, XYZ Airlines (XYZ 1 and XYZ 2) and one aircraft from a different carrier, ABC Airlines (ABC 3). Additionally, the processes described in this example will be considered to have been handled manually.

Further, in this example, the trajectory of all three aircraft is assumed to take them over the same airport arrival cornerpost. After passing the arrival cornerpost, the three aircraft then fly the same path to the airport, where they must merge with the aircraft from the other arrival cornerposts.

Immediately after the takeoff of the three aircraft, and using the trajectory prediction calculations within the present invention, these aircraft are predicted to be at the arrival cornerpost (fix point) at 1227 for XYZ1, XYZ 2 at 1233 and ABC 1 at 1233. Here, the fix point is chosen as close to the potential arrival airport (the point of possible congestion) as possible given the structure of the ATC system and other criteria. This prediction, along with resource capacity and other data and criteria, is continuously updated within the present invention as the new data becomes available and is inputted.

Additionally, the present invention continuously monitors the capacity of the cornerpost and airport. Based on previous experience and other criteria, the operator of the present invention is assumed to have determined that the cornerpost capacity is one aircraft per minute. Further, it is determined that the 1230 slot time must be designated as slack time. This data is inputted into the present invention.

After leveling off at the cruise altitude, the updated fix point predictions now show XYZ 1 is predicted to be at the arrival cornerpost (i.e., fix point) at 1228, XYZ 2 at 1234 and ABC 1 at 1231. At this point, the FOM for all three aircraft is calculated as being high enough to warrant a fix time slot reservation within the present invention.

The XYZ Airline's dispatcher (a ground based airline employee who tracks XYZ's flights) accesses the present invention. After internal calculations based on XYZ's business goals (see FIGS. 14*b* and 14*c*), the XYZ Airline's dispatcher has determined that XYZ should request fix time slots at 1230 for XYZ and at 1231 for XYZ 2. But from the present invention's display (see FIG. 13), the dispatcher sees that the fix point slot time at 1230 is designated as slack time, but the 1229 and 1231 slot times are available. The XYZ dispatcher then enters active reservation requests for a fix time slot for XYZ 1 at 1229 and XYZ 2 at 1231. Shortly thereafter, since ABC Airlines is not an active participant of the present invention, a passive reservation request for the 1231 slot time is entered by the present invention based on ABC 3's fix point prediction of 1231.

As can be seen, there is only one reservation request at 1229, but there are two requests for a slot time of 1231. XYZ 1 is assigned the 1229 slot time and, after exercising the internal calculations of the present invention to resolve the conflict for the slot time requests at 1231, XYZ 2 is assigned a fix time slot of 1231 and ABC 3 is assigned a fix time slot of 1232. This conflict resolution is based on numerous criteria that could include the scheduled arrival time, additional information supplied by the airlines, or other pertinent data and criteria such as safety, efficiency, aircraft characteristics, etc.

Once the slot times are assigned, the present invention communicates these slot time assignments to the appropriate personnel such that the aircraft trajectories can be altered accordingly to meet the slot time assignment. In the case of the XYZ flights, the XYZ dispatcher is notified of the fix time slot assignments, and then passes them on to the pilots of XYZ 1 and XYZ 2. The pilots then alter speed (and the lateral path, if required) to meet their cornerpost slot times.

In the case of ABC 3, a non-requesting participant, one embodiment of the present invention notifies the ATC controller of ABC 3's assigned cornerpost slot time. Then the ATC controller could notify the pilot of the assigned cornerpost time or the ATC controller could alter ABC 3's trajectory to meet the cornerpost slot time.

In addition, the cornerpost slot times are posted on a easily accessible display (i.e., intranet or private internet web site, see FIG. 13), which would show slot time 1229 filled by XYZ 1, slot time 1230 as slack time, 1231 filled by XYZ 2 and 1232 filled by ABC 3. From the display, XYZ, ABC and other users can request to trade, move, cancel or otherwise alter their aircraft's slot time. Additionally, if updated data or criteria shows that any of the flights would not make their assigned slot time, the capacity of the cornerpost or airport is changed, etc., this data would be inputted into the present invention and new slot times accordingly allocated.

These various examples of improvements in the efficient operation of assorted aircraft are achieved by the present invention's use of user interface screen such as that shown in FIG. 13. In the depicted preferred embodiment, information is presented about arrival slots into the selected airspace or fix. This typical screen contains one reservation slot for each available arrival slot and will be refreshed on a real-time basis. The number of slots in the data structure will be proportional to the arrival rate at the fix/airspace/airport/runway. For example, a corner post with an arrival rate of one aircraft per minute will have one data slot per minute or sixty for each hour. If that rate is reduced, say by flow restrictions from the aviation authority, then the number of reservation slots will be dynamically reduced. If the airspace is closed then no reservation slots will exist.

Reservation slots will have one of five states:

O—Open, no reservation currently exists for this time slot,

P—Passive reservation, the present invention is predicting a valid aircraft will take this slot even though no reservation has been made, L—Locked, a transaction is in process on this time slot, and R—An active reservation exists for a valid aircraft for this slot.

S—Slack, an unavailable open slot deemed necessary for the optimal aircraft flow As is shown in FIG. 12, a preferred embodiment of the present invention allows for slot time reservations to be made by the airline/user. These reservations are available based on policy as determined by the CAA or present invention operator. Absent other constraint, they can be available on a first come, first served basis. In one embodiment of the present invention, only when two parties request the same slot will the over-demand resolution calculations of the present invention be exercised.

Reservations may be claimed by any valid (meets FOM and other policy requirements to be classified as a valid flight) airspace user using one of two methods. First, active reservations are made by participating aircraft/users. In one embodiment, any participating user may access the present invention on-line using the secure CDMNet, an electronic or other access system. Any valid flight may claim an open slot. This process may be done manually by the dispatcher, or using some automated tool.

Secondly, if users do not chose to participate, they would be assigned a Passive reservation. These are implicit reservations made by non-participating aircraft. As part of the present invention, the present invention operator will constantly monitor the airspace and the trajectory of every aircraft. If a valid flight, whether participating or not, is bound for the selected airspace or point in space without an active reservation, the present invention will compute an estimated time of arrival. This time will be continuously updated as the flight progresses. Once the FOM of the aircraft meets a specified criteria, the present invention will assign a passive reservation for non-participating aircraft based on the calculated estimated time of arrival at the specified point in space.

Since the implementation of the method of the present invention uses a multi-dimensional calculation that evaluates numerous parameters simultaneously, the standard, yes-no arrival/departure slot times chart is difficult to construct for the present invention. Therefore, a table has been included as FIG. 14 to better depict the parameters that can alter the aircraft's trajectory and the solution of the present invention.

Data Lists 1 and 2 (FIGS. 14*b* and 14*c*) are seen to involve a number of airline/user/pilot-defined parameters that contribute to determining an airline's requirements for its aircraft's arrival/departure slot time. Since it would be difficult for a non-airline operator/CAA/airport to collect the necessary data to make these decisions, one embodiment of the present invention leaves the collection and incorporation of this data into the present invention to the airline/user/pilot. That said, it is then incumbent on the airline/user/pilot to access the present invention to reserve their arrival/departure slot time based on their internal requirements.

In Data List 1 (FIG. 14*b*), and initially ignoring other possibly interfering factors such as the weather, other aircraft's trajectories, external constraints to an aircraft's trajectory, etc., upwards of twenty aircraft parameters must be analyzed simultaneously to calculate an optimal arrival/departure slot time of an aircraft. This is quite different than current business practices within the aviation industry, which includes focusing arrival/departure predictions on a very limited data set (e.g., current position and speed, and possibly winds) and does not attempt to use this data to temporally alter the flow of aircraft.

In Data List 2 (FIG. 14*c*), an airline's local facilities at the destination airport are evaluated for their ability to meet the needs and/or wants of the individual aircraft, while also considering their possible interactions with the other aircraft that are approaching the same airport.

Once the airline/user/pilot data set is coordinated and the airline/operator/pilot has determined their optimal arrival/departure slot time for each of their aircraft, they then access the present invention to request and reserve their arrival/departure slot time.

Finally, in Data List 3 (FIG. 14*d*) the authority responsible (i.e., CAA) for the safe allocation of the asset (i.e., runway) must determine the safe capacity of that asset. For example, under current rules, aircraft of similar size must have three nautical miles separation between arrivals to a single runway. Further, the preceding aircraft must clear the runway before the next aircraft can land. In this example, if all of the aircraft are the same size, the safe arrival capacity of the dedicated arrival runway is approximately 50 aircraft per hour. Yet, weather can reduce this safe arrival capacity. For example, snow may slow the deceleration of the aircraft on the runway requiring longer runway occupancy times, therefore lowering capacity. The aviation authority must continually determine the safe capacity of each airspace/runway asset and assure the present invention is accurate at all times.

For hub airports, this can be a daunting task as thirty to sixty of a single airline's aircraft (along with numerous aircraft from other airlines) are scheduled to arrive at the hub airport in a very short period of time. The aircraft then exchange passengers, are serviced and take off again. The departing aircraft are also scheduled to takeoff in a very short period of time. Typical hub operations are one to one and a half hours in duration and are repeated eight to twelve times per day.

Finally, in FIG. 14*e*, the operator must use all of the data to find a more optimal solution to be implemented.

The view of the process within the present invention is shown in FIG. 15. In 1501, the present invention gathers the data, including weather data, necessary to compute predicted arrival times and system goals. It should be noted that the present invention also accepts flight plan and surveillance data from any valid source. In 1502, the aircraft's flight intent is constructed as a four-dimensional trajectory.

Next in 1503, as each trajectory is updated, its figure of merit (FOM) is calculated for each flight segment. This FOM includes the accuracy to which the present invention knows this data as well as any policy that might affect its use. For example, the present invention might be set to exclude from optimization any aircraft with 10 minutes of the congested area. Valid flights are determined based on FOM, company ownership, policy, etc. The FOM must be high enough (data accurate enough) in order to consider a flight valid to claim or be assigned a reservation. Additionally, if the aircraft is too far away to the point of arrival fix it may also be considered as invalid.

In 1504, the present invention calculates the predicted arrival time at the arrival fix for all aircraft in the system. The base trajectory is calculated based on flight plans, departure messages, amendment messages, and other related flight movement messages. It is then updated based on any available current surveillance.

In 1505, capacity is continuously calculated based on conditions and/or acceptance rate information for the congested airspace. For example, a corner post controller may be able to handle one aircraft per minute during normal conditions. At other times, say during heavy weather, the acceptance rate may be less or even zero. In 1506, the Capacity is continuously compared to the demand to determine if a constraint exists and as a first measure of the value of the goal function.

As each airline makes a valid request for an active reservation (1507), the system will evaluate that request to determine if it is valid or not and if the system can comply. If it is valid, the system will log that active reservation request. Additionally, necessary slack or buffer times (assigned based on experience and unpredictability of the system) are determined in 1508.

In 1509, the operator of the present invention utilizes a goal function to search for a more optimal solution whose value represents a higher attainment of system goals. The present invention then assigns passive reservations (1510) and active reservations (1511) for each valid aircraft in the system.

As also discussed above, the order of the aircraft, or their sequencing, as they approach the airport can also affect a runway's arrival/departure capacity. The present invention, along with the allocation policies as determined by the CAA or present invention operator, determines whether the arrival sequence is optimum or not for a set of arrival aircraft into an airport. With this information, a CAA/airline can potentially alter the arrival sequence and the assigned arrival/departure slot times so as to maximize a runway's arrival/departure capacity.

As suggested in FIG. 15, the present invention must determine the accuracy of the trajectories. It is obvious that if the trajectories are very inaccurate, the quality of any prediction based on these trajectories will be less than might be desired. The present invention determines the accuracy of the trajectories based on an internal predetermined set of rules and then assigns a Figure of Merit (FOM) to each trajectory. For example, if an aircraft is only minutes from arrival/departure, the accuracy of the estimated arrival/departure slot time is very high. There is simply too little time for any action that could alter the arrival/departure slot time significantly. Conversely, if the aircraft has filed its flight plan (intent), but has yet to depart Los Angeles for Atlanta there are many actions or events that would alter the predicted arrival/departure slot time.

It is easily understood that the FOM for these predictions is a function of time, among other factors. The earlier in time the prediction is made, the less accurate the prediction will be and thus the lower its FOM. The closer in time the aircraft is to arrival/departure, the higher the accuracy of the prediction, and therefore the higher its FOM. Effectively, the FOM represents the confidence the present invention has in the accuracy of the predicted arrival/departure slot times. Along with time, other factors in determining the FOM include validity of intent, available of wind/weather data, availability of information from the pilot, etc.

In step 1509 of FIG. 15, it was noted that a goal function could be use to assist in the allocation of the available slot times. The use of such goal functions is well known in the art of process optimization. However, when these goal functions are nonlinear functions of several variables, such as in the present case, it is not always clear how to proceed with the optimization of such functions. The following discussion is meant to help clarify this process.

To provide a better understanding how this goal function process' optimization routine may be performed, consider the following mathematical expression of a typical slot over demand problem in which a number of aircraft, 1 . . . n, are expected to arrive to a given point at time values $t_1 \ldots t_n$. They need to be rescheduled so that:

The time difference between two arrivals is not less than some minimum, Δ;

The arrival/departure times are modified as little as possible;

Some aircraft may be declared less "modifiable" than others.

We use $d_i$ to denote the change (negative or positive) our rescheduling brings to $t_i$. We may define a goal function that measures how "good" (or rather "bad") our changes are for the whole aircraft pool as $$G_1=\Sigma_i|d_i/r_i|^K$$

where $r_i$ are application-defined coefficients, putting the "price" at changing each $t_i$ (if we want to consider rescheduling the i-th aircraft "expensive", we assign it a small $r_i$, based, say, on safety, airport capacity, arrival/departure demand and other factors), thus effectively limiting its range of adjustment. The sum runs here through all values of i, and the exponent, K, can be tweaked to an agreeable value, somewhere between 1 and 3 (with 2 being a good choice to start experimenting with). The goal of the present invention is to minimize $G_1$ as is clear herein below.

Next, we define the "price" for aircraft being spaced too close to each other. For the reasons, which are obvious further on, we would like to avoid a non-continuous step function, changing its value at Δ. A fair continuous approximation may be, for example, $$G_2=\Sigma_{ij}P((\Delta-|d_{ij}|)/h)$$

where the sum runs over all combinations of i and j, h is some scale factor (defining the slope of the barrier around Δ), and P is the integral function of the Normal (Gaussian) distribution. $d_{ij}$ stands here for the difference in time of arrival/departure between both aircraft, i.e., $(t_i+d_i)(t_j+d_j)$.

Thus, each term is 0 for $|d_{ij}|>>\Delta+h$ and 1 for $|d_{ij}|<<\Delta-h$, with a continuous transition in-between (the steepness of this transition is defined by the value of h). As a matter of fact, the choice of P as the Normal distribution function is not a necessity; any function reaching (or approaching) 0 for arguments <<−1 and approaching 1 for arguments >>+1 would do; our choice here stems just from the familiarity.

A goal function, defining how "bad" our rescheduling (i.e., the choice of d) is, may be expressed as the sum of $G_1$ and $G_2$, being a function of $d_1 \ldots d_n$:

$$G(d_1 \ldots d_n)=K\Sigma_i C_i d_i^2+\Sigma_{ij}P((\Delta-|d_{ij}|)/h)$$

with K being a coefficient defining the relative importance of both components. One may now use some general numerical technique to optimize this function, i.e., to find the set of values for which G reaches a minimum. The above goal function analysis is applicable to meet many, if not all, of the individual goals desired by an airline/aviation authority.

To illustrate this optimization process, it is instructive to consider the following goal function for n aircraft:

$$G(t_1 \ldots t_n)=G_1(t_1)+\ldots+G_n(t_n)+G_0(t_1 \ldots t_n)$$

where each $G_i(t_i)$ shows the penalty imposed for the i-th aircraft arriving at time $t_i$, and $G_0$—the additional penalty for the combination of arrival times $t_1 \ldots t_n$. The latter may, for example, penalize when two aircraft take the same arrival slot.

In this simplified example we may define $$G_i(t)=a\times(t-t_S)^2+b\times(t-t_E)^2$$

so as to penalize an aircraft for deviating from its scheduled time, $t_S$, on one hand, and from its estimated (assuming currents speed) arrival time, $t_E$, on the other.

Let us assume that for the #1 aircraft $t_s=10$, $t_e=15$, a=2 and b=1. Then its goal function component computed according to the equation above, and as shown in FIG. 16, will be a square parabola with a minimum at 1 close to 12 (time can be expressed in any units, let us assume minutes). Thus, this is the "best" arrival time for that aircraft as described by its goal function and disregarding any other aircraft in the system.

With the same a and b, but with $t_S=11$ and $t_E=14$, the #2 aircraft's goal function component looks quite similar; the comparison is shown in FIG. 16.

Now let us assume that the combination component is set to 1000 if the absolute value $(t_1-t_2)<1$ (both aircraft occupy the same slot), and to zero otherwise. FIG. 17 shows the goal function values for these two aircraft.

The minimum (best value) of the goal function is found at $t_1=11$ and $t_2=12$, which is consistent with the common sense: both aircraft are competing for the $t_2=12$ minute slot, but for the #1 aircraft, the $t_1=11$ minute slot is almost as good. One's common sense would, however, be expected to fail if the number of involved aircraft exceeds three or five, while this optimization routine for such a defined goal function will always find the best goal function value.

Additionally, it should be noted that the description of the tracking and prediction of the aircraft asset herein is not meant to limit the scope of the patent. For example, the present invention will just as easily identify constraints and allocate access to those constrained resources for passengers, gates, food trucks, pilots, and other air transportation work-in-process assets. All of these must be tactically tracked and the arrival/departure prediction made as soon as possible and then continuously managed in real time to operate the aviation system in the most safe and efficient manner.

Furthermore, although the description of the current invention describes the time tracking and arrival/departure slot time management of aircraft to an arrival/departure fix, it just as easily tracks and manages the arrival/departure slot times of aircraft into or out of any system resource. These system resources may include a small path through a long line of otherwise impenetrable thunderstorms, an ATC control sector that is overloaded, etc.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as hereinafter set forth in the claims.

We claim:

1. A computer program product in a computer readable memory for controlling a processor to allow an aviation system to temporally allocate aircraft slot times during a specified period for the flow of a plurality of aircraft toward a specified fix point, based upon specified data pertaining to said aircraft, said fix point and associated system resources, and specified criteria for allocating said slot times, said computer program comprising:

- a means for collecting and storing said specified data and criteria,
- a means for processing said specified data applicable to each of said aircraft and associated resources so as to predict an arrival fix time for each of said aircraft at said specified fix point,
- a means for assigning to each of said plurality of aircraft a figure of merit whose value is a measure of how likely it is that said predicted arrival fix time will be achieved by said aircraft, wherein said figure of merit having a specified value, which, when exceeded, implies that said predicted arrival time is sufficiently reliable so as to warrant said aircraft to be considered for an allocation of one of said slot times,
- a means for accepting and storing a request by said operator of each of said aircraft for one of said slot times,
- a means for accepting and storing a request by a system operator to create slack time in said specified period,
- a means, utilizing said slot and slack time requests and the predicted arrival fix times for any of said plurality of aircraft for which a slot time request was not made, for predicting the demand for said slot times,
- a means, based upon specified data that is applicable to said specified period and fix point, for predicting the availability of said slot times within said specified period, and
- a means, based upon said operator requests, predicted demand for and availability of said slot times and said slot time allocation criteria, for allocating said slot times.

2. A computer program product as recited in claim 1 wherein said slot time allocation means including:

- a means for directing a communication device, which is accessible by said aircraft operators and said airline system, to communicate the relative situation of each of said aircraft approaching said fix point versus the available slot times and the requests of the other said aircraft operators and said airline system,
- a means for comparing the demand for versus the availability of said slot times to determine whether a conflict exists for a slot time,
- a means for identifying and evaluating alternative ways to resolve conflicts for said slot times, a means which considers said alternative ways to resolve slot time conflicts and yields a recommendation for resolving said conflict, a means, using said communication device, for communicating said recommended conflict resolution to said affected aircraft operators, a means for collecting and storing the input of said aircraft operators pertaining to the allocation of said slot times, a means, responsive to said requests and said aircraft operator input, for allocating said slot times.

3. A computer program product as recited in claim 1, wherein:

said specified data is chosen from the group consisting of the temporally varying positions and trajectories of said aircraft, the temporally varying weather conditions surrounding said aircraft, system resources and fix point, the flight handling characteristics of said aircraft, the safety regulations pertaining to said aircraft and system resources, the position, capacity, and availability status of said system resources.

4. A computer program product as recited in claim 2, further comprising a means that facilitates the trading of said allocated slot times among said aircraft operators.

5. A computer program product as recited in claim 2, wherein said means, responsive to said requests and said aircraft operator input, for allocating said slot times includes the use of a goal function.

6. A computer program product as recited in claim 2, wherein said specified data being temporally varying, said computer program further comprising:

a means for monitoring the ongoing temporal changes in said specified data so as to identify temporally-updated specified data, a means for updating said arrival fix times for each of said aircraft to which said temporally-updated specified data applies, a means for updating said predicted demand for and availability of slot times based upon said updated arrival fix times, and a means for updating said allocations based upon said updated predictions for demand for and availability of said slot times.

7. A method for an aviation system to temporally allocate aircraft slot times during a specified period for the flow of a plurality of aircraft toward a specified fix point, based upon specified data pertaining to said aircraft, said fix point and associated system resources, and aviation system specified criteria for allocating said slot times, said method comprising the steps of collecting and storing said specified data and criteria, processing said specified data applicable to each of said aircraft and associated resources so as to predict an arrival fix time for each of said aircraft at said specified fix point, assigning to each of said plurality of aircraft a figure of merit whose value is a measure of how likely it is that said predicted arrival fix time will be achieved by said aircraft, wherein said figure of merit having a specified value, which, when exceeded, implies that said predicted arrival time is sufficiently reliable so as to warrant said aircraft to be considered for an allocation of one of said slot times, accepting and storing a request by an aircraft operator for one of said slot times, accepting and storing a request by a system operator to create slack time in said specified period, utilizing said slot and slack time requests and the predicted arrival fix times for any of said plurality of aircraft for which a slot time request was not made for predicting the demand for said slot times, predicting, based upon specified data that is applicable to said specified period and fix point, the availability of said slot times within said specified period, and allocating, based upon said operator requests, predicted demand for and availability of said slot times and said slot time allocation criteria, said slot times.

8. A method as recited in claim 7, wherein said step of allocating said slot times including the steps of:

directing a communication device, which is accessible by said aircraft operators and said airline system, to communicate the relative situation of each of said aircraft approaching said fix point versus the available slot times and the requests of the other said aircraft operators and said airline system, comparing the demand for versus the availability of said slot times to determine whether a conflict exists for a slot time, identifying and evaluating alternative ways to resolve conflicts for said slot times, recommending, based upon consideration of said alternative ways to resolve slot time conflicts, a means for resolving said conflict, communicating, using said communication device, said recommended conflict resolution to said affected aircraft operators, collecting and storing the input of said aircraft operators pertaining to the allocation of said slot times, allocating, responsive to said requests and said aircraft operator input, said slot times.

9. A method as recited in claim 7, wherein:

said specified data is chosen from the group consisting of the temporally varying positions and trajectories of said aircraft, the temporally varying weather conditions surrounding said aircraft, system resources and fix point, the flight handling characteristics of said aircraft, the safety regulations pertaining to said aircraft and system resources, the position, capacity, and availability status of said system resources.

10. A method as recited in claim 8, further comprising the step of facilitating the trading of said allocated slot times among said aircraft operators.

11. A method as recited in claim 8, wherein said step of allocating, responsive to said requests and said aircraft operator input, said slot times includes the use of a goal function.

12. A method as recited in claim 8, wherein said specified data being temporally varying, said method further comprising the steps of:

monitoring the ongoing temporal changes in said specified data so as to identify temporally-updated specified data, updating said arrival fix times for each of said aircraft to which said temporally-updated specified data applies, updating said predicted demand for and availability of slot times based upon said updated arrival fix times, and updating said allocations based upon said updated predictions for demand for and availability of said slot times.

13. A system, including a processor, memory, display and input device, that allows an aviation system to temporally allocate aircraft slot times during a specified period for the flow of a plurality of aircraft toward a specified fix point, based upon specified data pertaining to said aircraft, said fix point and associated system resources, and aviation system specified criteria for allocating said slot times, said system comprising:

a means for collecting and storing in said memory said specified data and criteria, a means directing said processor to process said specified data applicable to each of said aircraft and associated resources so as to predict an arrival fix time for each of said aircraft at said specified fix point, a means for assigning to each of said plurality of aircraft a figure of merit whose value is a measure of how likely it is that said predicted arrival fix time will be achieved by said aircraft, wherein said figure of merit having a specified value, which, when exceeded, implies that said predicted arrival time is sufficiently reliable so as to warrant said aircraft to be considered for an allocation of one of said slot times, a means for directing said input device to accept and store a request by said operator of each of said aircraft for one of said slot times, a means for directing said input device to accept and store a request by a system operator to create slack time in said specified period, a means, utilizing said slot and slack time requests and the predicted arrival fix times for any of said plurality of aircraft for which a slot time request was not made, for predicting the demand for said slot times, a means, based upon specified data that is applicable to said specified period and fix point, for predicting the availability of said slot times within said specified period, and a means, based upon said operator requests, predicted demand for and availability of said slot times and said slot time allocation criteria, for allocating said slot times.

14. A system as recited in claim 13 wherein said slot time allocation means including:

a means for directing said display, which is accessible by said aircraft operators and said airline system, to communicate the relative situation of each of said aircraft approaching said fix point versus the available slot times and the requests of the other said aircraft operators and said airline system, a means for comparing the demand for versus the availability of said slot times to determine whether a conflict exists for a slot time, a means for identifying and evaluating alternative ways to resolve conflicts for said slot times, a means which considers said alternative ways to resolve slot time conflicts and yields a recommendation for resolving said conflict, a means, using said display, for communicating said recommended conflict resolution to said affected aircraft operators, a means, utilizing said input device, for collecting and storing the input of said aircraft operators pertaining to the allocation of said slot times, a means, responsive to said requests and said aircraft operator input, for allocating said slot times.

15. A system as recited in claim 13, wherein:

said specified data is chosen from the group consisting of the temporally varying positions and trajectories of said aircraft, the temporally varying weather conditions surrounding said aircraft, system resources and fix point, the flight handling characteristics of said aircraft, the safety regulations pertaining to said aircraft and system resources, the position, capacity, and availability status of said system resources.

16. A system as recited in claim 14, further comprising a means that facilitates the trading of said allocated slot times among said aircraft operators.

17. A system as recited in claim 14, wherein said means, responsive to said requests and said aircraft operator input, for allocating said slot times includes the use of a goal function.

18. A system as recited in claim 14, wherein said specified data being temporally varying, said system further comprising:

a means for monitoring the ongoing temporal changes in said specified data so as to identify temporally-updated specified data, a means for updating said arrival fix times for each of said aircraft to which said temporally-updated specified data applies, a means for updating said predicted demand for and availability of slot times based upon said updated arrival fix times, and a means for updating said allocations based upon said updated predictions for demand for and availability of said slot times.

* * * * *